(12) United States Patent
Sakita

(10) Patent No.: US 6,446,595 B1
(45) Date of Patent: Sep. 10, 2002

(54) ROTARY PISTON ENGINE

(76) Inventor: Masami Sakita, P.O. Box 61089, Palo Alto, CA (US) 94306

( * ) Notice: Subject to any disclaimer, the term of this patent is extended or adjusted under 35 U.S.C. 154(b) by 0 days.

(21) Appl. No.: 09/898,983

(22) Filed: Jul. 3, 2001

Related U.S. Application Data

(60) Provisional application No. 60/289,240, filed on May 7, 2001.

(51) Int. Cl.$^7$ ............................................. F02B 53/00
(52) U.S. Cl. ..................... 123/245; 123/247; 74/437; 475/198; 418/112
(58) Field of Search ............................. 123/245, 247, 123/234, 220, 221, 236; 418/36, 35, 185, 112, 142; 74/437, 435; 475/198

(56) References Cited

U.S. PATENT DOCUMENTS

| | | | | |
|---|---|---|---|---|
| 88,215 | A | | 3/1869 | Ruggles ........................ 418/36 |
| 1,224,642 | A | | 5/1917 | Holmes ........................ 418/35 |
| 2,108,385 | A | | 2/1938 | Murakami .................... 418/36 |
| 2,657,676 | A | | 11/1953 | Mallnckrodt ................. 418/35 |
| 2,804,059 | A | | 4/1957 | Honjyo ........................ 123/245 |
| 3,256,866 | A | | 6/1966 | Bauer ........................... 123/245 |
| 3,294,071 | A | | 12/1966 | Turco ........................... 418/35 |
| 3,396,632 | A | | 8/1968 | LeBlanc ...................... 123/245 |
| 3,398,643 | A | | 8/1968 | Schudt ......................... 418/36 |
| 3,585,874 | A | | 6/1971 | Ingham ........................ 74/393 |
| 3,730,654 | A | | 5/1973 | McMahon .................... 418/36 |
| 3,769,946 | A | | 11/1973 | Scherrer ........................ 48/36 |
| 3,990,405 | A | * | 11/1976 | Kecik ........................... 123/245 |
| 4,003,681 | A | | 1/1977 | Wildhaber ..................... 48/36 |
| 4,026,246 | A | * | 5/1977 | Larrea .......................... 123/245 |
| 4,028,019 | A | | 6/1977 | Wildhaber .................... 418/36 |
| 4,055,091 | A | | 10/1977 | Kerr ............................. 74/394 |
| 4,057,374 | A | * | 11/1977 | Seybold ....................... 123/245 |
| 4,646,694 | A | | 3/1987 | Fawcett ....................... 123/245 |
| 4,901,694 | A | | 2/1990 | Sakita .......................... 123/234 |
| 5,133,317 | A | | 7/1992 | Sakita .......................... 123/234 |
| 5,192,201 | A | * | 3/1993 | Beben .......................... 123/245 |
| 5,381,766 | A | | 1/1995 | Sakita .......................... 123/245 |
| 5,433,179 | A | | 7/1995 | Wittry .......................... 123/245 |
| 6,289,867 | B1 | | 9/2001 | Free | |

FOREIGN PATENT DOCUMENTS

| | | | | |
|---|---|---|---|---|
| DE | 35 01 779 A1 | * | 7/1986 | ................. 123/247 |
| JP | 58-79623 | | 5/1987 | |
| JP | 6002559 A | * | 1/1994 | |
| SU | 589192 | | 1/1978 | |

OTHER PUBLICATIONS

J. A. Spanogle, et al., Increasing the Air Charge and Scavenging the Clearance Volume of a Compression–Ignition Engine, NACA Report No. 469 Jun. 10, 1933, Langley Field, VA.

* cited by examiner

*Primary Examiner*—Thomas Denion
*Assistant Examiner*—Thai-Ba Trieu

(57) ABSTRACT

A rotary piston engine (20) is shown that includes a housing (22) having a toroidal working chamber with inlet (56) and exhaust (54) ports. First and second piston assemblies (30 and 32), each of which includes at least one pair of diametrically opposed pistons (30A and 30B, and 32A and 32B), are located in the working chamber.

Piston assemblies (30 and 32) are connected to the engine output shaft through a differential (78) and the Sakita gear sets (74 and 76), each of which gear sets includes a Sakita type 1 gear (74A or 76A) and a Sakita type 2 gear (74B or 76B). The piston assemblies rotate at variable speed, whereby pistons of the slower speed are trailing pistons during portions of the power and intake phases of engine operation. In one embodiment, the Sakita type 1 gear includes teeth in the form of rollers. Also, spark plugs embedded within piston assemblies (30 and 32) are accessible from outside.

18 Claims, 23 Drawing Sheets

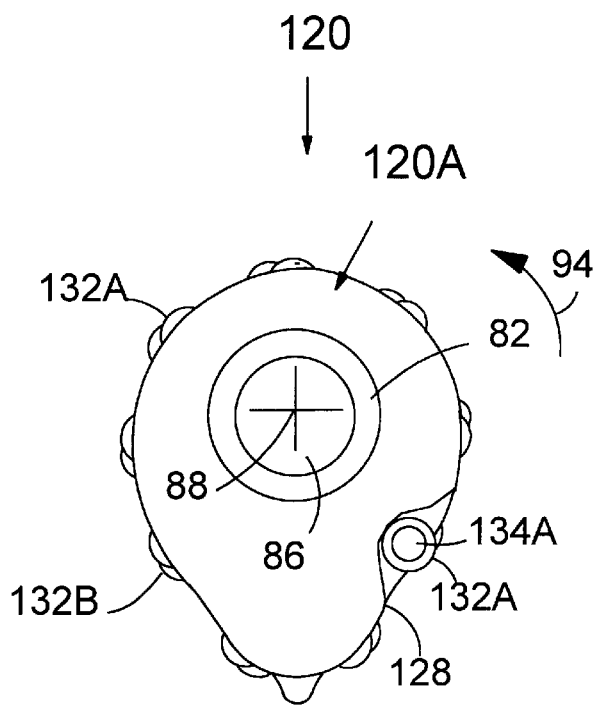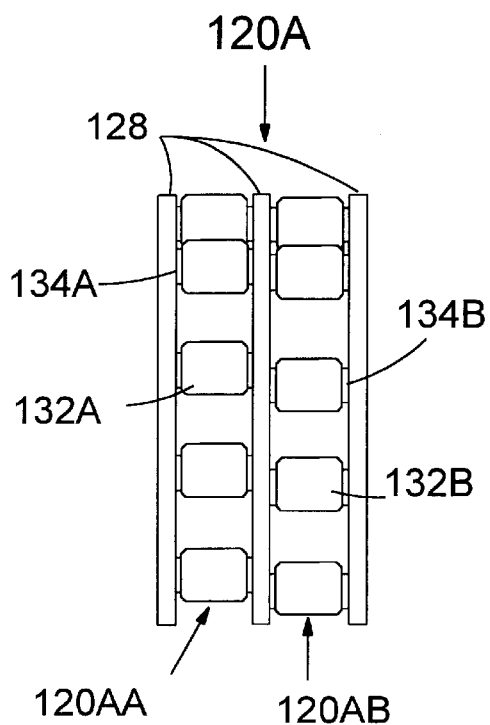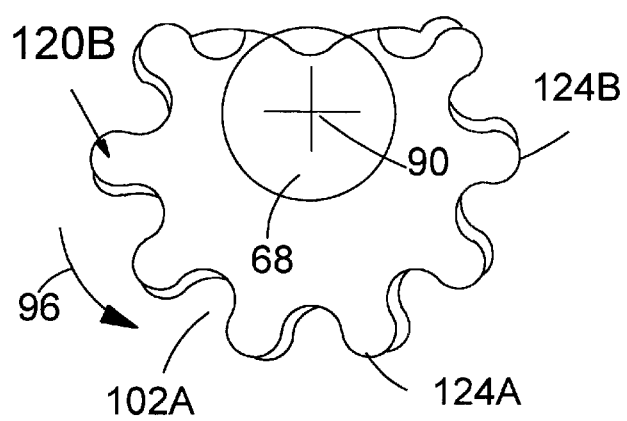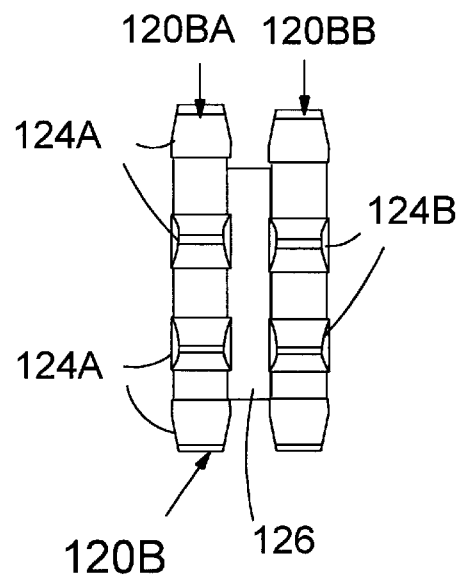
Fig. 17                                  Fig. 18

Fig. 24A $$\omega_0 = (\omega_1 + \omega_2)/2 \qquad (1)$$

$$Y_1 = D/(2 + \alpha) \qquad (2)$$

$$Y_2 = D/(2 - \alpha) \qquad (3)$$

$$X_1 = D(1 + \alpha)/(2 + \alpha) \qquad (4)$$

$$X_2 = D(1 - \alpha)/(2 - \alpha) \qquad (5)$$

$$x\omega_0 = (D - x)\omega \qquad (6)$$

$$\omega = \omega_0 + (\omega_0 - \omega_{min})\cos(\theta\pi/\theta_1) \qquad (7)$$

$$x = D[1 + \alpha\cos(\theta\pi/\theta_1)]/[2 + \alpha\cos(\theta\pi/\theta_1)] \qquad (8)$$

$$y = D/[2 + \alpha\cos(\theta\pi/\theta_1)] \qquad (9)$$

$$\theta_y = \int_0^\theta [1 + \alpha\cos(\theta\pi/\theta_1)]d\theta \qquad (10)$$

FIG. 24B $$\theta_y = \theta + \alpha(\theta_1/\pi)\sin(\theta\pi/\theta_1) \qquad (11)$$

$$\theta_y = (\theta_1/\pi)\cos^{-1}\beta + \alpha(\theta_1/\pi)\sin(\cos^{-1}\beta) \qquad (12)$$

where $\alpha = (\omega_0 - \omega_{min})/\omega_0$ $\beta = (D - 2y)/(\alpha y)$ and $\omega_0 = W0;\ \omega_1 = W1;\ \omega_2 = W2;\ \omega_{min} = Wmin;$ $\alpha = $ alpha; $\beta = $ beta; $\pi = $ pi;

$Y_1 = Y1;\ Y_2 = Y2;\ X_1 = X1;\ X_2 = X2;$ $\theta = Q;\ \theta_1 = Q_1;\ \theta_y = Q_y;$ and $\cos^{-1} = $ acos in Detailed Description of Specification.

ROTARY PISTON ENGINE

This application is entitled to the benefit of provisional application entitled "Rotary Piston Engine" application Ser. No. 60/289,240 filed on May 7, 2001.

FIELD OF THE INVENTION

This invention relates generally to rotary piston engines and in particular to rotary piston engines that include first- and second-piston assemblies that are interconnected for alternate variable-speed rotation whereby pistons of the slower piston assembly comprise trailing pistons during the power and intake phases of the engine operating cycle.

BACKGROUND OF THE INVENTION

The only currently commercially available rotary engine, the Wankel engine, is compact and lightweight, simple in design, capable of producing high torque output, and easy to maintain. It is not energy efficient, however, because the sealing attached to apexes of the piston cannot completely seal off the cavity on the chamber wall used for the spark plug, so gas leaks between subchambers every time the apex of the piston passe s the s park plug cavity. In the so-called cat-and-mouse types of rotary engines such as those found in U.S. Pat. No. 5,133,317—Sakita; U.S. Pat. No. 4,901,694—Sakita; U.S. Pat. No. 4,646,694—Fawceft; U.S. Pat. No. 3,398,643—Schudt; U.S. Pat. No. 3,396,632—LeBlanc; U.S. Pat. No. 3,256,866—Bauer; 2,804,059 Honjyo; U.S. Pat. No. 5,433,179—Wittry; and the present invention, the severity of possible gas leaks caused by the spark plug cavity on the working chamber wall should be much less because the pistons are wide enough to cover the cavity, and the piston rings on either side of piston seal off the spark plug cavity from the subchambers. The only way to completely eliminate gas leaks, however, is to eliminate the spark plug cavity on the wall, or embed the spark plug in the piston and make it easily accessible from the outside. Installing a spark plug within the piston should have the further advantage of permitting ignition timing to be optimally adjusted to the speed of rotation or richness of the gas mixture independently of the piston location.

The present invention is an extension of the work presented in U.S. Pat. No. 5,381,766 by the present inventor, Sakita. In said patent, the present inventor described a rotary engine equipped with a gear mechanism that enables intermittent rotation of pistons, namely, the stopping of the trailing pistons while the leading pistons are rotating at maximum speed. The gear mechanism provides said engine with the smallest overall working chamber and the thinnest piston to produce a specified output. There is a possibility, however, that some applications, including the aforementioned spark plug adoption or adoption in diesel engines in which robust structures are required, may require thicker pistons than are possible in engines with intermittent rotation of pistons. Also, at high-speed operation, engines with intermittent operation may not necessarily be the most efficient; this is because the nonstopping piston of the intermittent operation engine rotates faster than the faster piston in the nonintermittent rotation engine, and may cause higher mechanical loss. Thus, the present inventor felt the need to devise a gear set that allows rotation of the pistons for any designed speed profiles.

The earlier patent (U.S. Pat. No. 5,381,766—Sakita) uses spur gears of varying radius or gears with roller bearings for the heart- and teardrop-shaped gears. If the spur gears are used and teeth are fully attached around the periphery of the gear, the teeth may have to be small and the gears undesirably wide. Larger teeth may be used if gear teeth are not attached in the vicinity of the teardrop-shaped gear's apex and the corresponding sections of the heart-shaped gear; not attaching gear teeth at a portion of the heart- and teardrop-shaped gears, however, would require the gears to be twice as thick. This is another area for improvement the present invention addresses.

Another improvement focused on in the present invention is the adoption of technologies that are known to further improve engine output and energy efficiency with no or little additional power requirements, such as the use of different compression ratios for compression and expansion (U.S. Pat. No. 5,433,179—Wittry) and the use of an air nozzle for scavenging exhaust air (NACA Report No.469, Increasing the Air Charge and Scavenging the Clearance Volume of a Compression-Ignition Engine, J. S. Spanogle, C. W. Hicks, and H. H. Foster, Langley Field, Va., June 1933).

With the present invention, realization of rotary piston engines that produce the highest output and are the most energy efficient for given design conditions will become possible.

OBJECTS OF THE INVENTION

An object of this invention is the provision of a working chamber that is equipped with a means to allow easy access to spark plugs installed inside the piston assembly.

An object of this invention is the provision of interconnecting piston assemblies to enable variable-speed operation of the pistons as specified by the engine designer.

An object of this invention is the provision of a pair of gears that remain engaged at all times while rotating with specified rotational speed profiles.

An object of this invention is the provision of a working chamber such that the compression ratio computed as the maximum volume of the compression subchamber over the minimum volume of the compression subchamber is in an acceptable range for a given engine type but will be higher if the compression ratio is computed as the maximum volume of the combustion subchamber over the minimum volume of the combustion subchamber, wherein the minimum volume of the compression subchamber equals the minimum volume of combustion subchamber.

An object of this invention is the provision of a working chamber equipped with an exhaust port wider than the piston width to permit ending of the expansion phase before the piston reaches the end of the combustion phase.

An object of this invention is the provision of an air nozzle that is installed at the mouth of the exhaust port to scavenge the exhaust air that remains within the exhaust subchamber at the end of the cycle.

An object of this invention is the provision of a pair of gears that are equipped with teeth specially designed for gears with variable rotational speeds.

SUMMARY OF THE INVENTION

The present invention includes an engine with working chamber within which the first and second piston assemblies rotate about a rotational axis. Each piston assembly includes a hollow piston hub to which one or more pairs of diametrically opposed pistons are attached. The pairs of pistons divide the working chamber into a plurality of subchambers in which a single pair of diametrically opposed pistons per piston assembly provides four subchambers in the working chamber, and two pairs of diametrically opposed pistons per piston assembly provide eight subchambers in the working chamber. A spark plug having electrodes with spark gaps is installed within the piston assembly such that the electrodes communicate with a subchamber through a hole bored at the center of the piston surface. A spark plug maintenance hole is bored on the side of the engine housing for accessing the spark plug from outside. The first and second piston assemblies are connected to the first and second input shafts, respectively, of the differential means for rotation in the same direction. With one complete revolution of the piston assemblies, four engine operating cycles are completed for a four-piston engine and eight operating cycles are completed for an eight-piston engine, with each operating cycle comprising the power, exhaust, intake, and compression phases. The interconnection between the first and second piston assemblies results in rotation of each piston such that as the leading piston increases its rotational speed, the trailing piston decreases its rotational speed, and as the leading piston decreases its rotational speed, the trailing piston increases its rotational speed. The engine's working chamber includes a compression subchamber that is smaller than the combustion subchamber. The intake port, exhaust port, and piston widths are adjusted so that the compression ratio computed as the maximum volume over the minimum volume of the compression subchamber will be within the normally acceptable range for a given engine type, but the compression ratio computed as the maximum volume over the minimum volume of the combustion subchamber is generally higher than the normal compression ratio.

The present invention includes differential means having first and second input shafts and an output shaft, together with first and second noncircular gear sets. Each of the first and second gear sets includes two types of intermeshing noncircular gears we call Sakita type 1 and type 2 gears (or type 1 and type 2 gears). The extension of the differential output becomes the output shaft, which is connected through a circular gear set to an idler shaft to which type 2 gears are affixed. The type 1 gears of the first and second gear sets are connected to the first and second differential input shafts, respectively. The type 1 gears rotate with widely varying speeds, while the type 2 gears rotate at the same rate as the output shaft of the engine. The differential assures that the sum of the rotational speed of the type 1 gears equals twice the rotational speed of the type 2 gears.

BRIEF DESCRIPTION OF THE DRAWINGS

The above and other objects and advantages of the invention will be better understood from the following description when considered with the accompanying drawings. It here will be understood that the drawings are for purposes of illustration only and not by way of limitation of the invention. In the drawings, like reference characters refer to the same parts in the several views:

FIG. 17 is a diagram showing the front view of an alternative type 1 and type 2 gear set;

FIG. 18 a diagram showing the side view of said alternative type 1 and type 2 gear set;

FIGS. 24A and 24B show, using mathematical notations and commonly used Greek letters for some variables and constants, Equations (1) through (12) described in this Specification.

DETAILED DESCRIPTION OF THE INVENTION

Engine's Working Chamber

Figure 1:
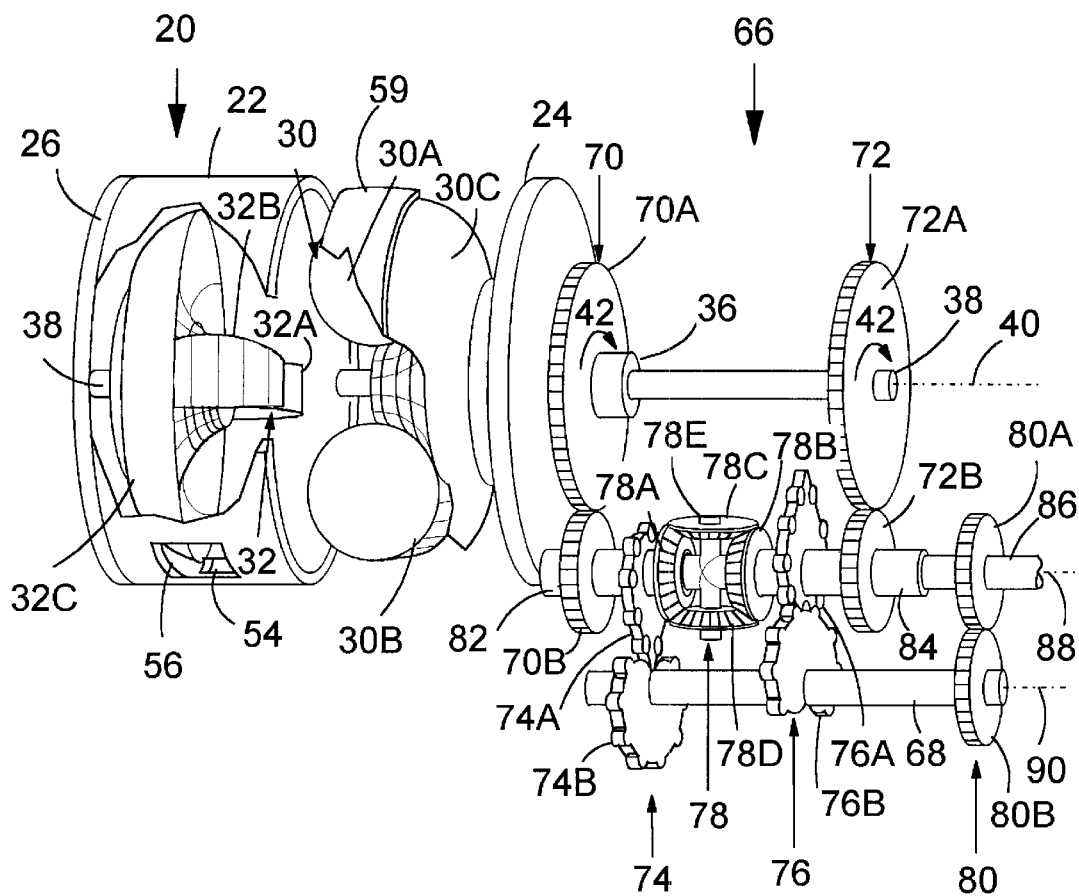
FIG. 1 is an exploded isometric view of a rotary piston engine embodying the present invention.

Reference now is made to FIG. 1 of the drawings wherein an engine 20 is shown to include a stationary cylindrical housing 22 having a bore that is closed at opposite ends by engine's housing walls 24 and 26 attached thereto as by bolts or other suitable means, not shown, containing a toroidal working chamber inside. The engine's working chamber formed by piston assemblies 30, 32 and stationary outer cover 59, is divided into first and second pairs of diametrically opposed subchambers by pistons included in first and second piston assemblies 30 and 32. The piston assemblies 30 and 32 are rotatable about a common axis 40 and, in operation, rotate in the same direction as indicated by arrows 42. Piston assembly 30 includes a pair of diametrically opposed pistons 30A and 30B attached to piston hub 30C, and piston assembly 32 includes a pair of diametrically opposed pistons 32A and 32B attached to piston hub 32C. Pistons 30A and 30B are affixed to the outer piston shaft 36 through piston hub 30C. The inner piston shaft 38 is rotatably mounted in the tubular shaft 36. Pistons 32A and 32B of second piston assembly 32 are attached to inner piston shaft 38 through piston hub 32C at diametrically opposed positions. The working chamber is divided into two pairs of diametrically opposed subchambers by four pistons 30A, 30B, 32A, and 32B in a four-piston engine as shown in FIG. 1. Each piston assembly alternately rotates with a faster and slower speed such that trailing pistons rotate at a slower speed than leading pistons during the power and intake phases of engine operation, and periodically variable volume subchambers are provided between adjacent pistons. The engine housing 22 has an opening for an exhaust port 54, and an opening for an intake port 56. Engine's working chamber is also shown in FIGS. 2 and 3 of the drawings.

Figure 2:
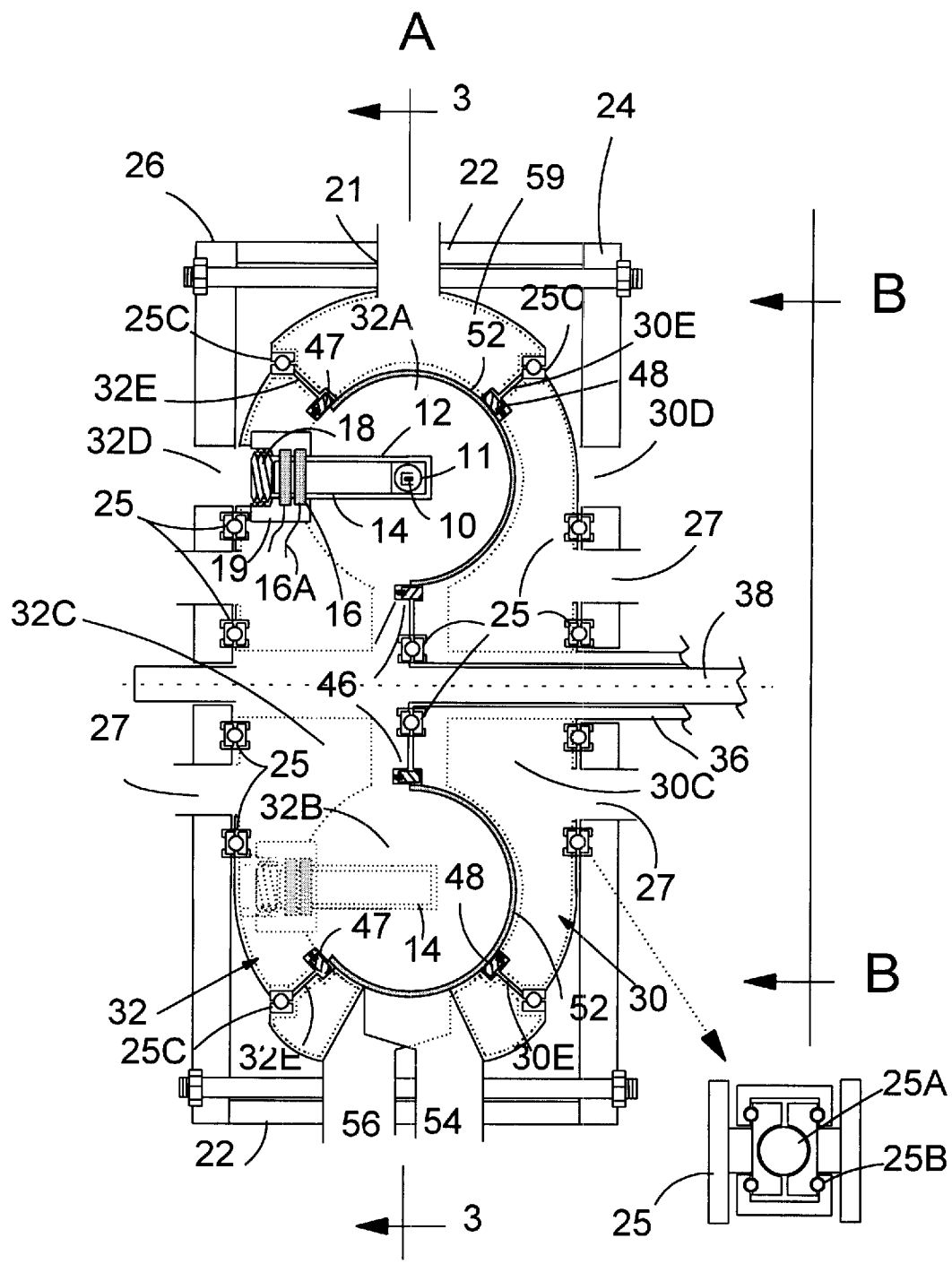
FIG. 2 is a cross-sectional view of the working chamber with a detailed view of the ball bearings.
Figure 3:
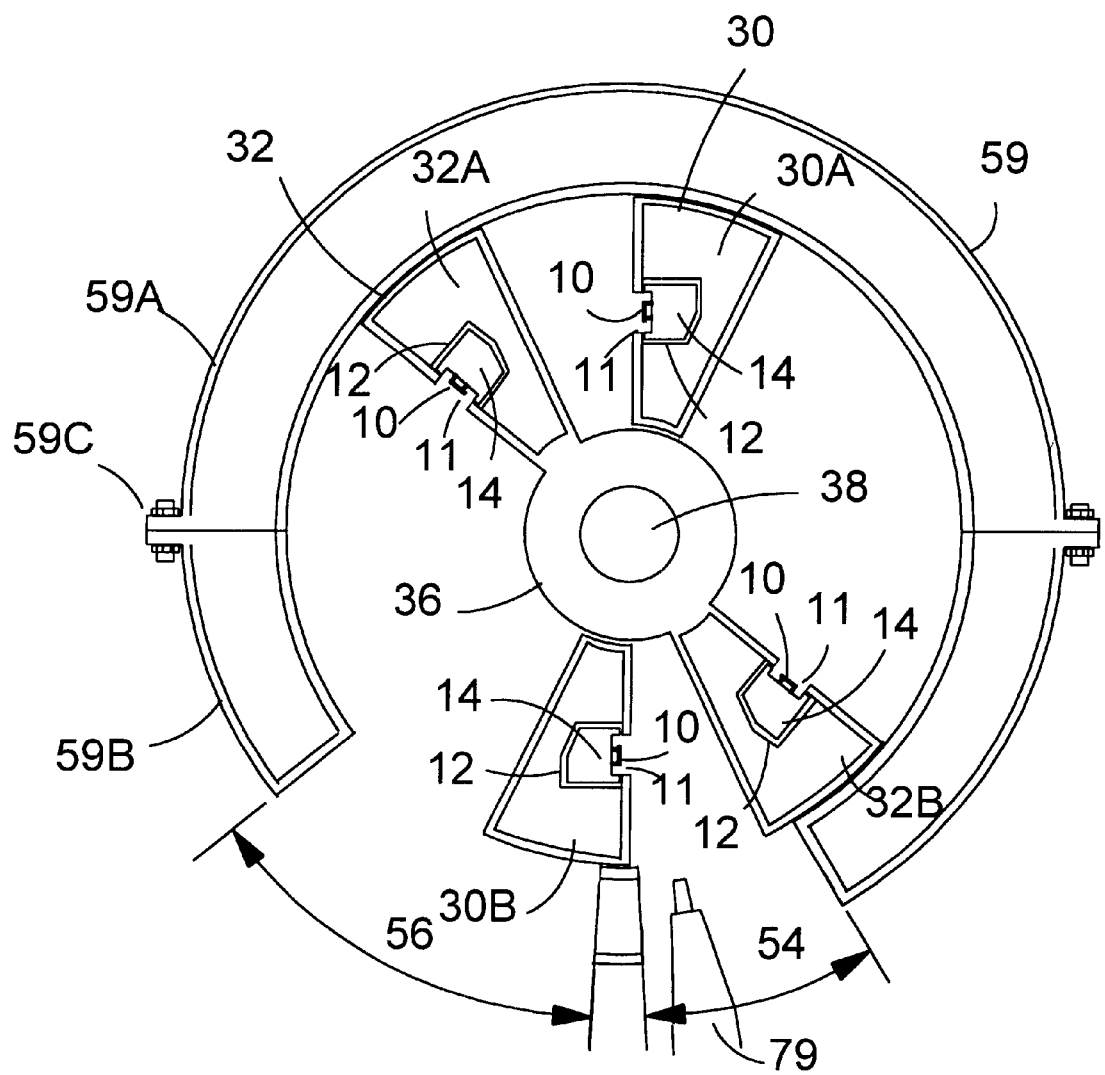
FIG. 3 is an enlarged sectional view taken along line A—A of FIG. 2.

Reference is now made to FIG. 2 of the drawings, wherein are shown the engine housing 22 comprising an outer cover 59 and housing walls 24 and 26, within which piston assemblies 30 and 32 are located. Openings for port 27 in the engine housing walls are provided through which port air or another type of gas used for cooling is brought into the hollow piston assemblies 30 and 32. The cooling gas is sent from the outer end of the piston assemblies 30 and 32 to the outer cover 59 through openings 30E and 32E and then back to the air or gas pump, which is equipped with an air/gas cooling mechanism, not shown, from port 21 of the outer cover 59.

A spark plug 14 is housed in a casing 12 inside piston 32A with no openings at one end, one opening 11 on a side, near the end of the casing facing a near-side subchamber in FIG. 2, and another opening at the other end of casing 12 facing wall 26. A spark plug maintenance hole 32D is included on wall 26 of the engine housing for access to spark plug 14 carried by pistons 32A and 32B for removal and replacement of the spark plug. Spark plug 14 communicates with a subchamber through opening 11. A power terminal case 19 made of a nonconductive material is installed within the piston assembly 32 to function as a socket to the spark plug 14. The power terminal case 19 has two electric terminals 16 made of conductive material from which the spark plug 14 takes electricity. From the electric terminals 16, electric wires 16A are extended to the power source, not shown. The spark plug 14 gets electricity from terminals 16. A seal 18 secures the spark plug 14 in its place and seals off the casing 12 from the outer atmosphere. A spark plug is provided for each of the subchambers into which the working chamber is divided by the pistons. A spark plug 14 and its peripheral parts that are housed in piston 32B are shown in FIG. 2 in dotted line. Similarly, spark plug 14 embedded in pistons 30A and 30B are accessible through a spark plug maintenance hole 30D in housing wall 24.

Means to support horizontal forces, such as ball bearing 25, which comprising a main bearing ball 25A, smaller bearing balls 25B and support rings as shown in FIG. 2A, are placed between piston assemblies 30 and 32, between piston assembly 30 and wall 24, and between piston assembly 32 and wall 26. Conventional ball bearings 25C are placed between piston assembly 30 and outer cover 59 and between piston assembly 32 and outer cover 59.

Reference is now made to FIG. 3 of the drawings, wherein the toroidal working chamber's outer cover 59 comprising an upper half 59A and a lower half 59B, attached by means such as bolts 59C, is shown. A spark plug 14 in each of pistons 30A, 30B, 32A, and 32B, having electrodes 10 with spark gaps, is attached to the back of the piston surface such that the spark plug spark's electrode can ignite the fuel gas mixture in the engine's subchamber through hole 11. The outer cover 59 has an exhaust port 54, the width of which is generally the same as the piston width, but it may be cut wider than the piston width in the direction of piston travel if needed for better breathing or for preventing the gas pressure in the exhaust subchamber from becoming lower than the outside atmospheric pressure. The outer cover 59 is also equipped with an intake port 56, which is generally cut wider than the piston width and also the exhaust port in the direction of piston travel. The maximum volume of the compression subchamber is generally smaller than the maximum volume of the combustion subchamber, and the piston width is adjusted so that the compression ratio computed as the maximum volume of the compression subchamber over the minimum volume of the compression subchamber is in an acceptable range for a given engine type. Consequently, the compression ratio computed as the maximum volume of the combustion subchamber over the minimum volume of the combustion subchamber may be higher than the normally acceptable range. The exhaust port is provided with an air nozzle 79 at its mouth to spray fresh air into the exhaust subchamber for scavenging the remaining exhaust air inside the subchamber.

Figure 4:
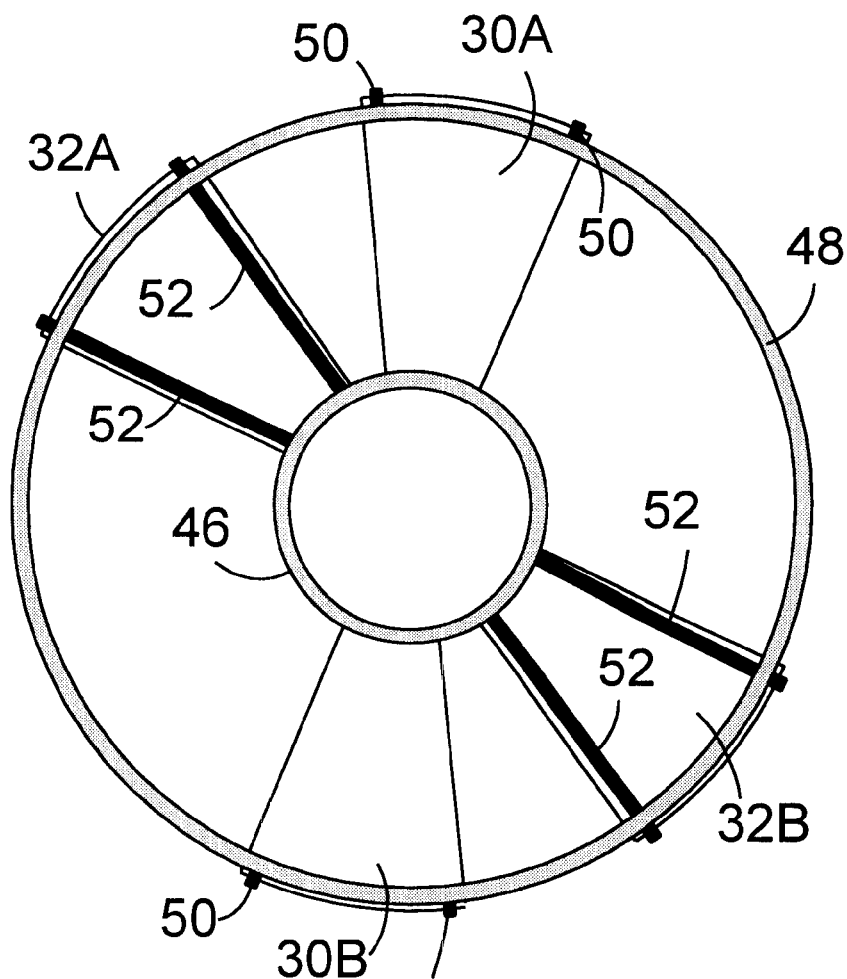
FIG. 4 is a skeletal view of piston assemblies with emphasis on sealing rings, a view taken from B of FIG. 2.

Referring to FIG. 4 of the drawings, with the illustrated four-piston engine, sealing of subchambers to prevent the flow of gases therebetween is provided by any suitable means, including for example, semicircular piston rings 50 along the outer convex surfaces of pistons 30A and 30B and semicircular piston rings 52 along the outer convex surfaces of pistons 32A and 32B. Circular seal means 47 (not shown in FIG. 4, but shown in FIG. 2) is placed along the crevice between piston assembly 32 and outer cover 59, and circular seal means 48 is placed along the crevice between piston assembly 30 and outer cover 59 for sealing engagement between each of the piston assemblies and the outer cover. Similarly, a circular seal means 46 is placed along the crevices between the piston assemblies for sealing engagement between the two piston assemblies.

Figure 5:
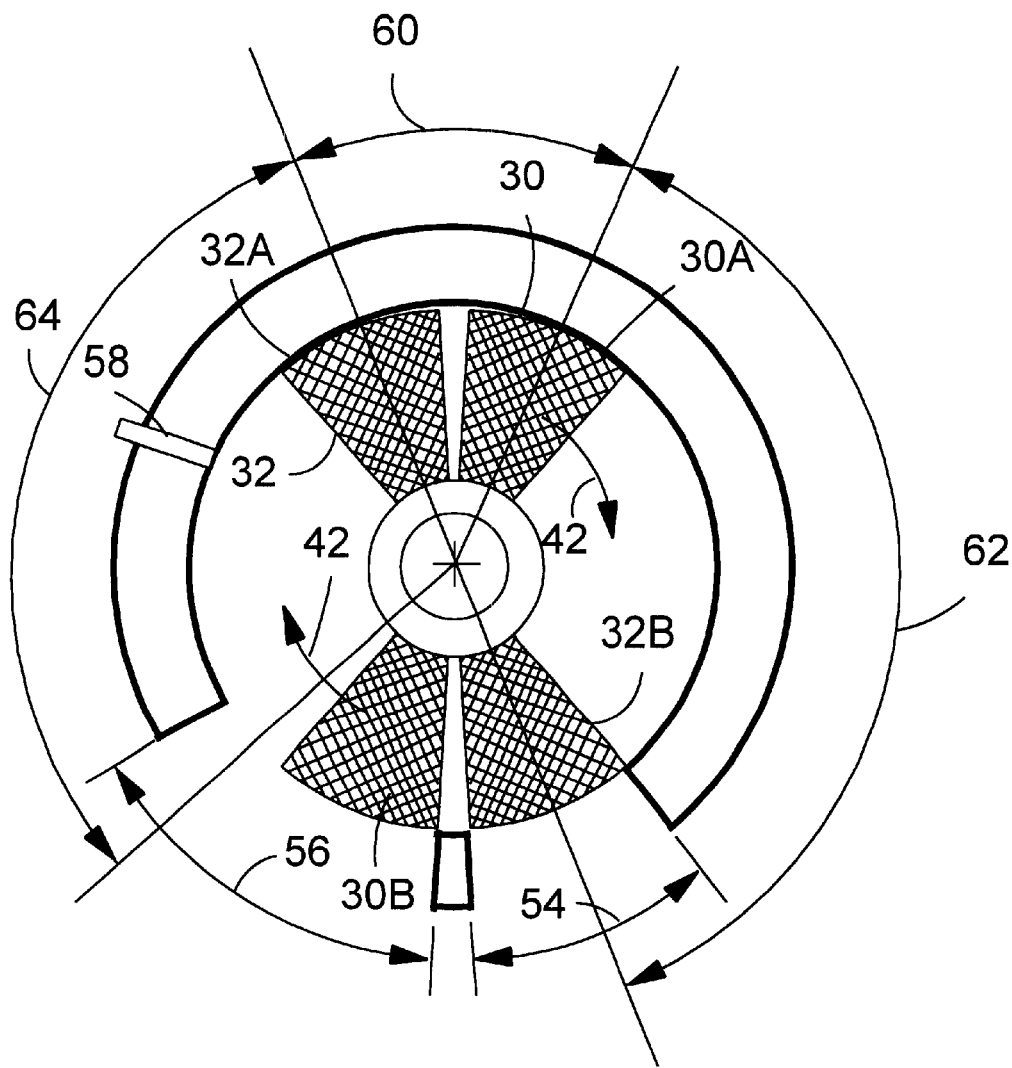
FIG. 5 is a schematic illustration showing separation of functions within the working chamber of a four-piston engine.

Referring to FIG. 5 of the drawings, with the illustrated four-piston engine, the working chamber is divided into four subchambers. The power phase of engine operation occurs during the angular movement of the leading piston is within segment arrow 62; the exhaust phase of the engine occurs during the angular movement of the trailing piston is within segment 62; the intake phase occurs during the angular movement of the leading piston is within segment 64; and the compression phase occurs during the angular movement of the trailing piston is within segment 64. If one of the pistons is within segment 62, we say that the piston assembly is in the active phase, and if one of the pistons is within segment 60, we say that the piston assembly is in the nonactive phase. FIG. 5 shows that piston assembly 30 that includes pistons 30A and 30B has just finished the nonactive phase and is just about to start the active phase, and piston assembly 32 that includes pistons 32A and 32B has just finished the active phase and is just about to start the nonactive phase. The exhaust port 54 and intake port 56, and a fuel injection nozzle 58, which is connected to the source of fuel, injects fuel into the compression subchamber following intake of air through intake port 56 are also shown in FIG. 5.

Figure 6:
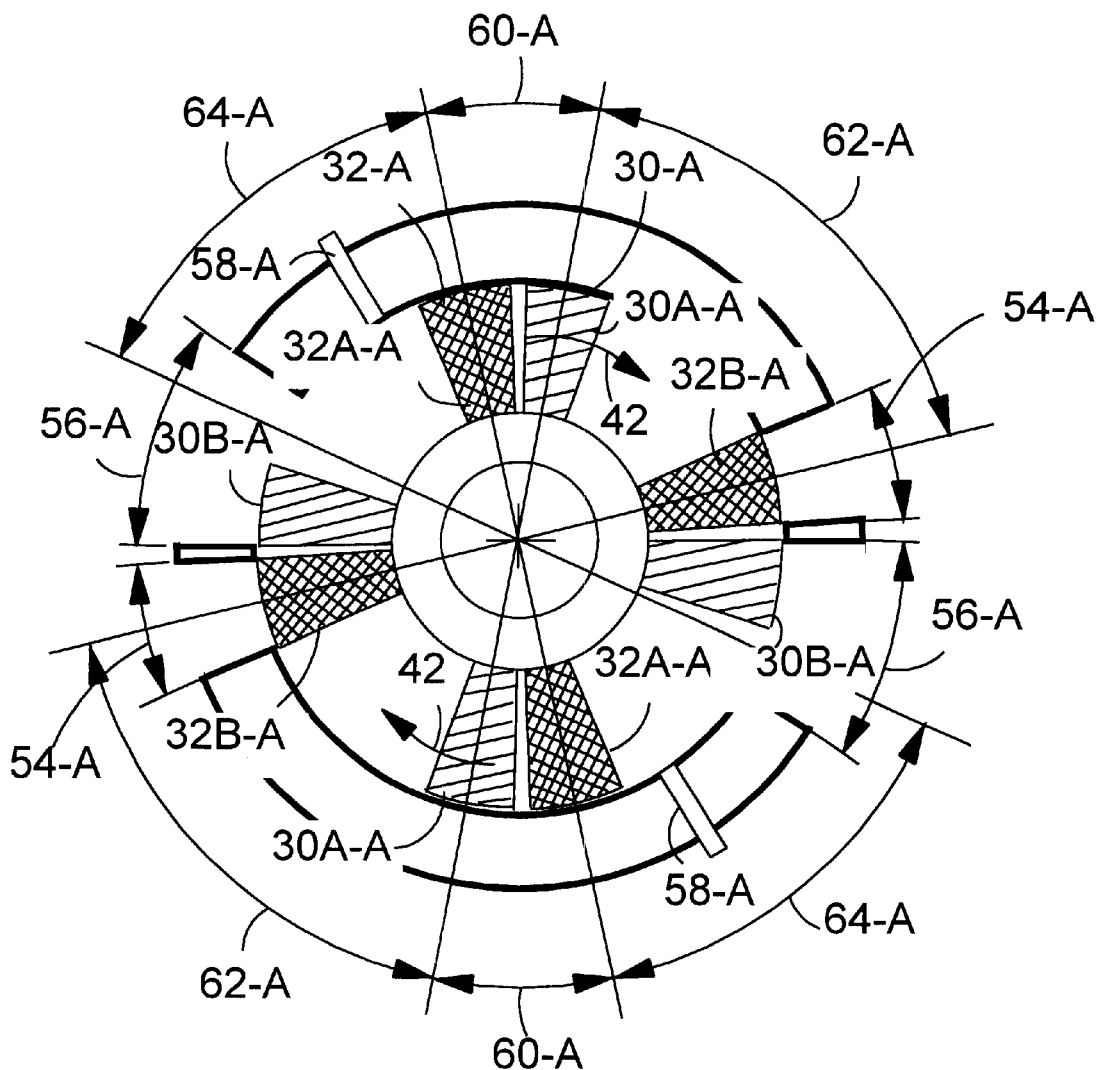
FIG. 6 is a schematic illustration showing separation of functions within the working chamber of an eight-piston engine.

With an eight-piston engine as illustrated in FIG. 6 of the drawings, the working chamber is divided into eight subchambers. The power phase of engine operation occurs during the angular movement of the leading piston is within segment arrow 62-A; the exhaust phase of the engine occurs during the angular movement of the trailing piston is within segment 62-A; the intake phase occurs during the angular movement of the leading piston is within segment 64-A; and the compression phase occurs during the angular movement of the trailing piston is within segment 64-A. If one of the pistons is within segment 64-A, we say that the piston assembly is in the active phase, and if one of the pistons is within segment 60-A, we say that the piston assembly is in the nonactive phase. FIG. 6 shows that piston assembly 30-A that includes pistons 30A-A and 30B-A has just finished the nonactive phase and is just about to start the active phase, and piston assembly 32-A that includes pistons 32A-A and 32B-A has just finished the active phase and is just about to start the nonactive phase. Exhaust ports 54-A and intake ports 56-A, and fuel injection nozzles 58-A, which are connected to the source of fuel, inject fuel into the compression subchambers following intake of air through intake ports 56-A are also shown in FIG. 6.

Connecting means, identified generally by reference numeral 66, for operatively connecting the first and second piston assemblies 30 and 32 to an engine output shaft 86 and for providing the piston assemblies with variable speed rotation, now will be described with reference to FIG. 1.

Connecting Means—66

In the embodiment of the invention illustrated in FIG. 1, connecting means 66 includes circular gear sets 70 and 72, noncircular gear sets 74 and 76, differential means 78, and circular gear set 80. Suffixes A and B are used to identify the separate gears of the gear pairs. Gear 70A of gear set 70 is connected to piston assembly 30 through outer piston shaft 36, and gear 72A of gear set 72 is connected to the other piston assembly 32 through inner piston shaft 38. For the illustrated four-piston engine, circular gear pairs 70 and 72 are provided with a 1:2 gear ratio whereby gears 70B and 72B undergo two complete revolutions for each complete revolution of piston shafts 36 and 38, respectively. In an eight-piston engine, the gear ratio of gear pairs 70 and 72 is 1:4, whereby gears 70B and 72B undergo four complete revolutions for each complete revolution of piston shafts 36 and 38, respectively. The rest of the gear and shaft arrangement in connecting means 66 for an eight-piston engine is identical to that of a four-piston engine.

Circular gears 70B and 72B are affixed to tubular shafts 82 and 84, respectively, which are rotatably mounted on spider shaft 86 of differential 78. Spider shaft 86, which for purposes of description also is defined as the differential output, is supported by suitable bearings, not shown, for rotation about axis 88, which extends parallel to piston shaft axis 40. Spider shaft 86 is also the engine output shaft, which is connected through a circular gear set 80 to an idler shaft 68 to which gears 74B and 76B are affixed. Affixed to tubular shaft 82 are gear 74A of noncircular gear set 74 and end gear 78A of differential 78 for simultaneous rotation thereof with gear 70B. Similarly, tubular shaft 84 has affixed thereto gear 76A of noncircular gear set 76 and end gear 78B of differential 78 for simultaneous rotation thereof with gear 72B. For purposes of description, shafts 82 and 84 to which differential end gears 78A and 78B are affixed, are defined as differential inputs. Differential 78 may be of any conventional type such as the illustrated bevel gear differential which, in addition to end, or sun, gears 78A and 78B, includes spider, or planet, gears 78C and 78D rotatably mounted on spider cross shaft 78E. Spider gears 78C and 78D mesh with end gears 78A and 78B. It should be apparent that noncircular gear sets 74 and 76 are of the same design. Also, it should be apparent that connecting means that does not include differential 78 and uses shaft 68 as the output shaft is possible.

For easier identification of gear sets and gears used in the present invention, we will call the noncircular gear sets represented by 74 and 76 the Sakita gear set, gears represented by 74A and 76A the Sakita type 1 gear (or type 1 gear), and gears represented by 74B and 76B the Sakita type 2 gear (or type 2 gear) wherein the Sakita type 1 and type 2 gear geometries are defined as those which conform to conditions given in Equations (1) through (5) in the following section with no specific definition of gear teeth. It will become apparent that the gear set consisting of teardrop- and heart-shaped gears that enable intermittent rotation of pistons described in U.S. Pat. No. 5,381,766 by the present inventor is a special case of the Sakita gear set.

Definition of Type 1 and Type 2 Gear Geometries

The relationship between the rotation of gears 78A and 78B, or differential inputs, and gear 80A, which is connected to the spider shaft 86, or differential output, of differential 78 is expressed as shown in (1) below. All equations presented in this Specification are also shown in FIGS. 24A and 24B of the drawings, using mathematical notations and commonly used Greek letters for some variables and constants.

$$W0 = (W1 + W2)/2 \tag{1}$$

where $W0$=rotational speed of spider shaft 86 and gear 80A, $W1$=rotational speed of sun gear 78A, and $W2$=rotational speed of sun gear 78B.

Because gears 78A and 78B are connected to gears 74A and 76A, respectively, and gear 80B that meshes with 80A at the ratio of 1:1 is connected to gears 74B and 76B, the relationship given in (1) holds for $W0$=rotational speed of gears 74B and 76B, $W1$=rotational speed of gear 74A, and $W2$=rotational speed of gear 76A.

Figure 7:
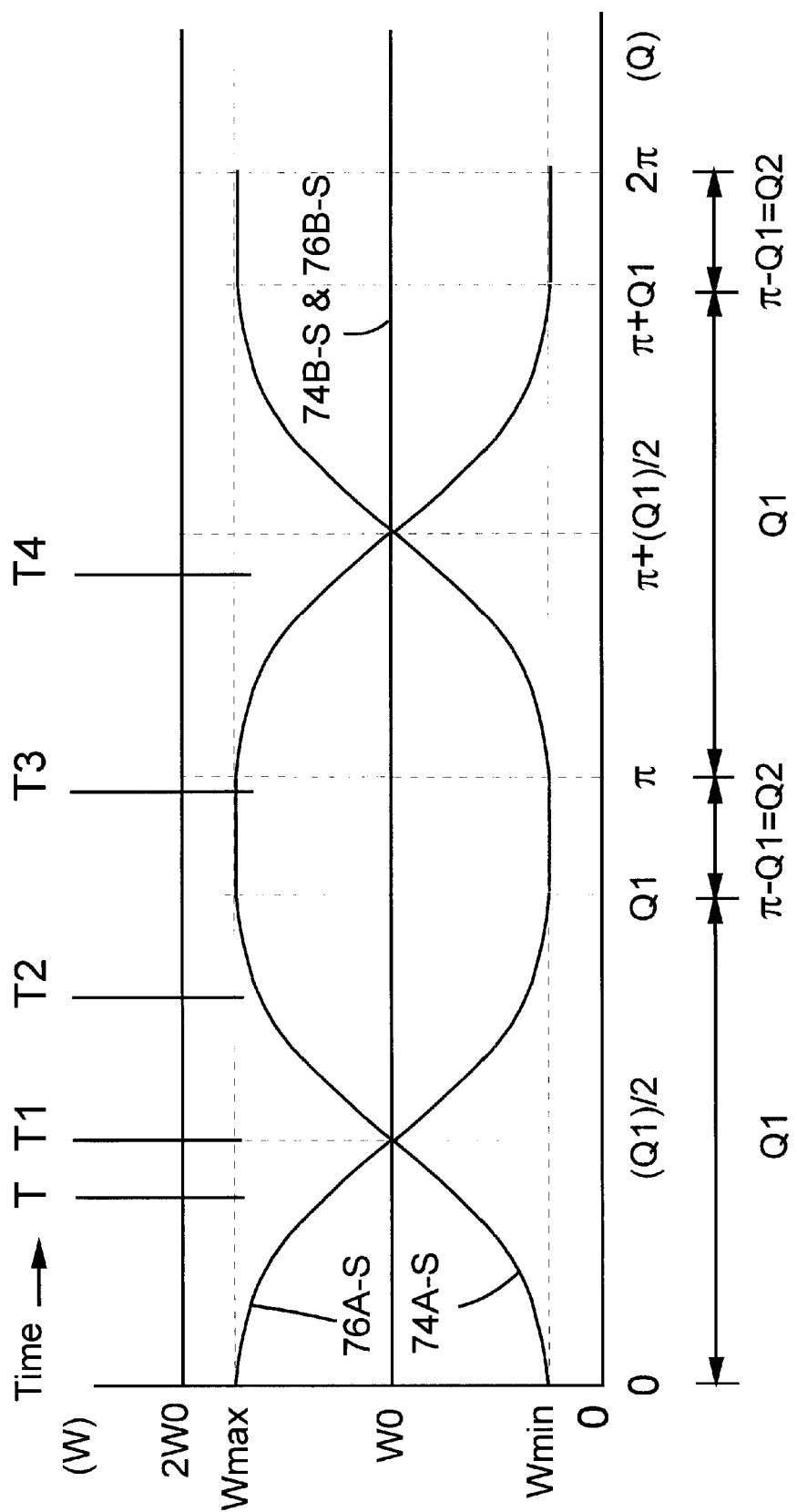
FIG. 7 is a diagram showing the rotational speed profile of type 1 and type 2 gears.
Figure 8:
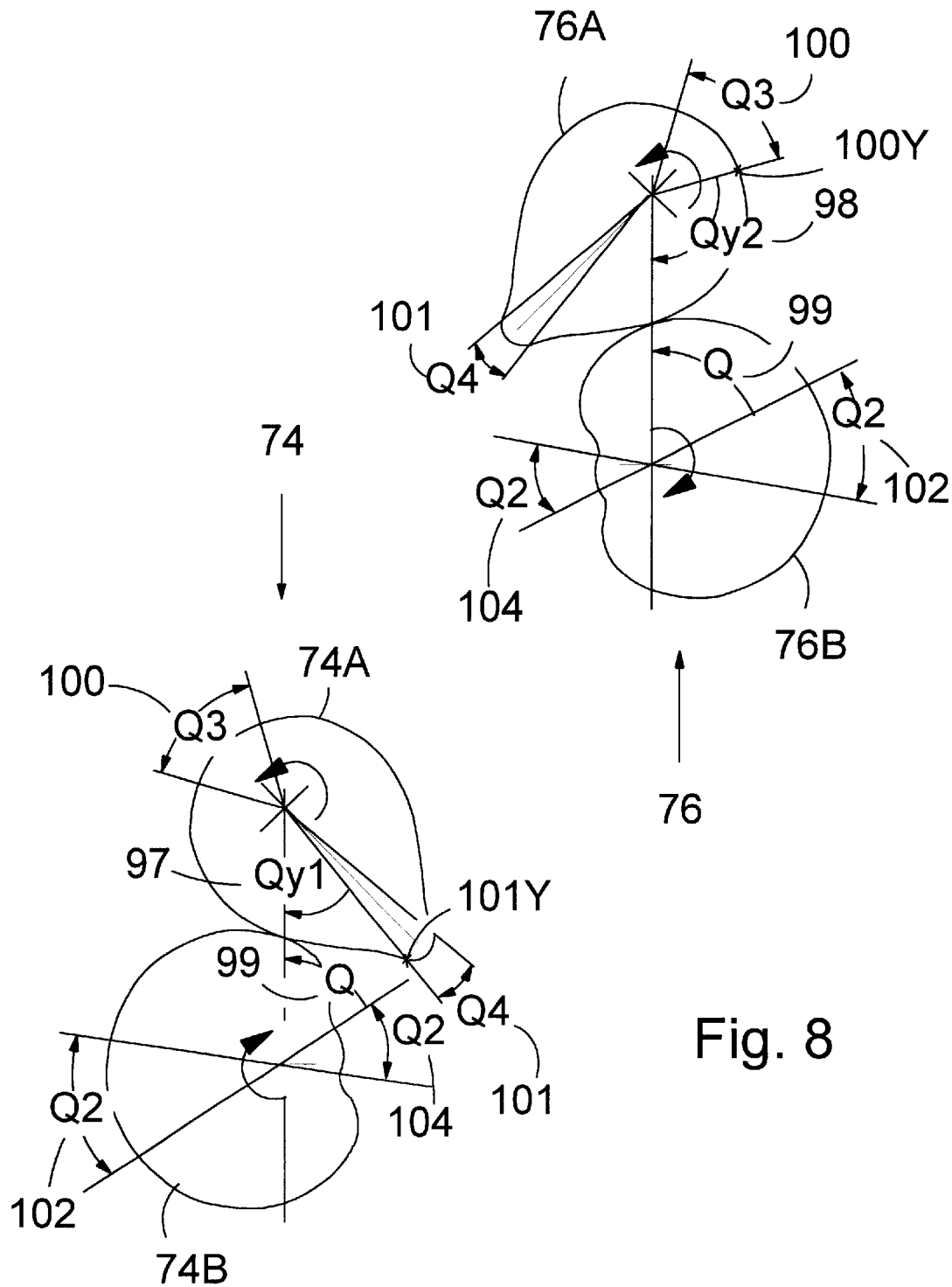
FIG. 8 is a schematic diagram of type 1 and type 2 gears with no gear teeth shown.

Operation of the connecting means 66 will best be understood with reference to FIGS. 7 and 8 of the drawings. The speed profile of type 1 gears, an example of which is schematically given in FIG. 7 of the drawings, shows the way the speed of type 1 gears 74A and 76A vary as they rotate relative to the rotational angle of type 2 gears 74B and 76B, wherein type 2 gears 74B and 76B keep a constant rotational speed W0. The horizontal axis (Q) indicates the rotational angle of type 2 gears 74B and 76B in radian, and the vertical axis (W) indicates the rotational speed of type 1 gears 74A and 76A and type 2 gears 74B and 76B. The rotational speed of type 1 gear 74A is represented by 74A-S, that of type 1 gear 76A by 76A-S, that of type 2 gear 74B is represented by 74B-S, and that of type 2 gear 76B by 76B-S. The positions of type 1 and type 2 gears corresponding to the gear operation at time point T in FIG. 7 are given in FIG. 8. At that time, rotational angle of type 2 gears 74B and 76B measured from the end of circular segments 104 and 102, respectively, is Q (99).

At Q=0 in FIG. 7, type 1 gear 74A is at 101Y, or the end of circular segment 101 (FIG. 8), ready to increase its rotational speed, and type 1 gear 76A is at 100Y, or the end of circular segment 100 (FIG. 8), ready to decrease its rotational speed. While type 2 gears 74B and 76B each travels Q (99), type 1 gear 74A travels Qy1 (97) and type 1 gear 76A travels Qy2 (98) as shown in FIG. 8. In FIG. 7, the rotational speed of type 1 and type 2 gears 74A and 76A and type 2 gears 74B and 76B all becomes equal at Q=(Q1)/2 and later again at Q=pi+(Q1)/2, where pi signifies Greek letter "pi" denoting the ratio of the circumference of a circle to its diameter. Type 1 gear 74A is in a nonactive phase of operation between Q=0 and Q=(Q1)/2, in an active phase between Q=(Q1)/2 and Q=pi+(Q1)/2, and in a nonactive phase between Q=pi+(Q1)/2 and 2pi. Type 1 gear 76A is in an active phase of operation between Q=0 and Q=(Q1)/2, in a nonactive phase between Q=(Q1)/2 and Q=pi+(Q1)/2, and in an active phase between Q=pi+(Q1)/2, and 2pi. Type 1 gear 74A rotates at maximum speed, Wmax, and type 1 gear 76A rotates at minimum rotational speed, Wmin, between Q1 and pi, during which time gear set 74 meshes at the circular segments 100 and 102 of gears 74A and 74B, respectively, while gear set 76 meshes at the circular segments 101 and 104 of gears 76A and 76B, respectively. Type 1 gear 74A rotates at minimum rotational speed, Wmin, and type 1 gear 76A rotates at maximum rotational speed, Wmax, between pi+Q1 and 2pi, during which time gear set 74 meshes at the circular segments 101 and 104 of gear 74A and 74B, respectively, while gear set 76 meshes at the circular segments 100 and 102 of gears 76A and 76B, respectively. The rotational angle of type 1 gear 74A while type 2 gear 74B rotates from Q1 to pi is Q3, and the rotational angle of type 1 gear 76A while type 2 gear 76B rotates from Q1 to pi, is Q4. The rotational angle of the type 2 gear in the same duration is Q2=pi−Q1. If neither type 1 nor type 2 gears have circular segments, then, Q1=pi, and Q2=Q3=Q4=0. Note that from Equation (1) above, Wmax=2W0−Wmin.

Figure 9:
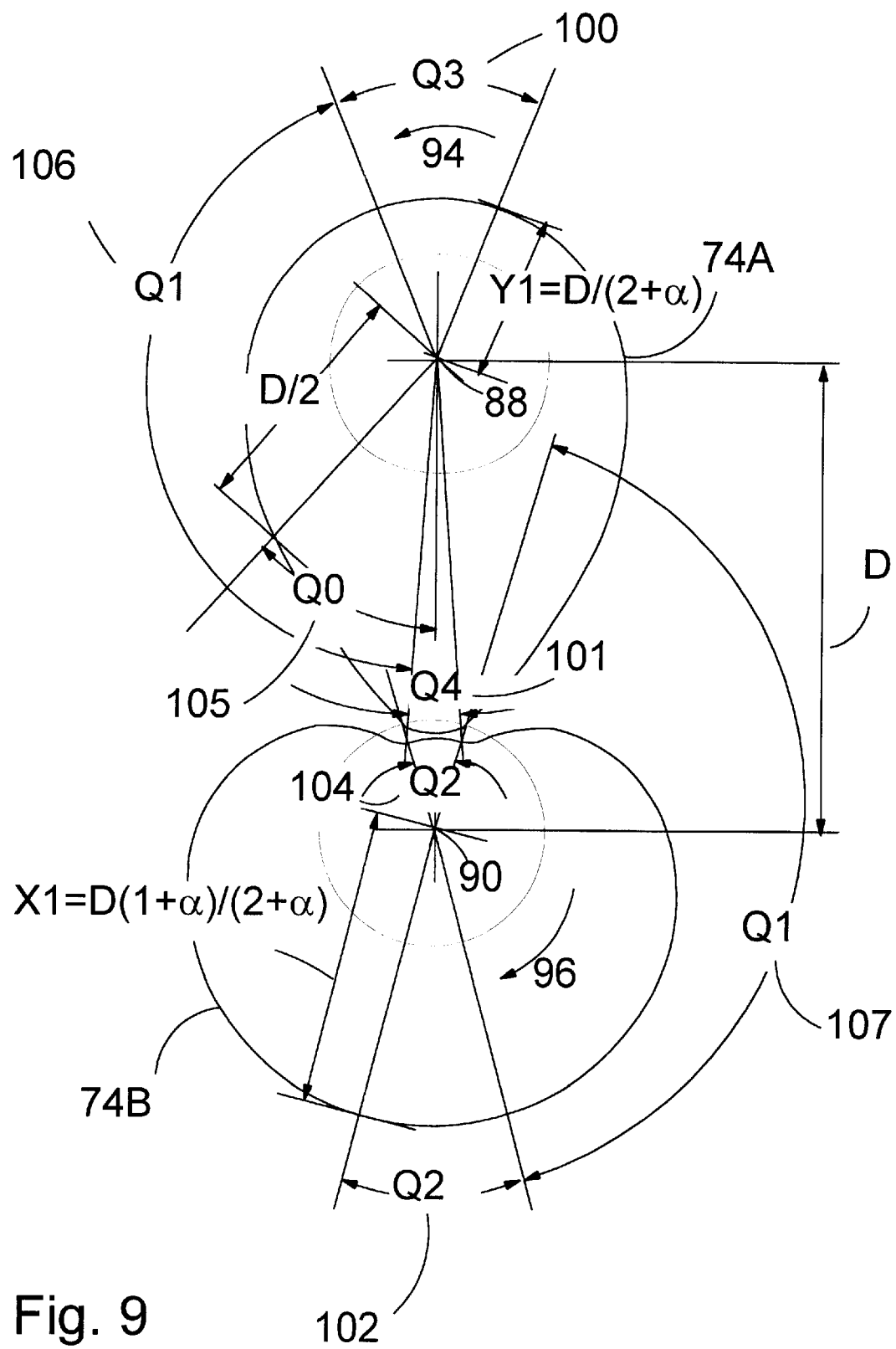
FIG. 9 is a diagram of geometries of the type 1 and type 2 gears with no gear teeth shown.
Figure 10:
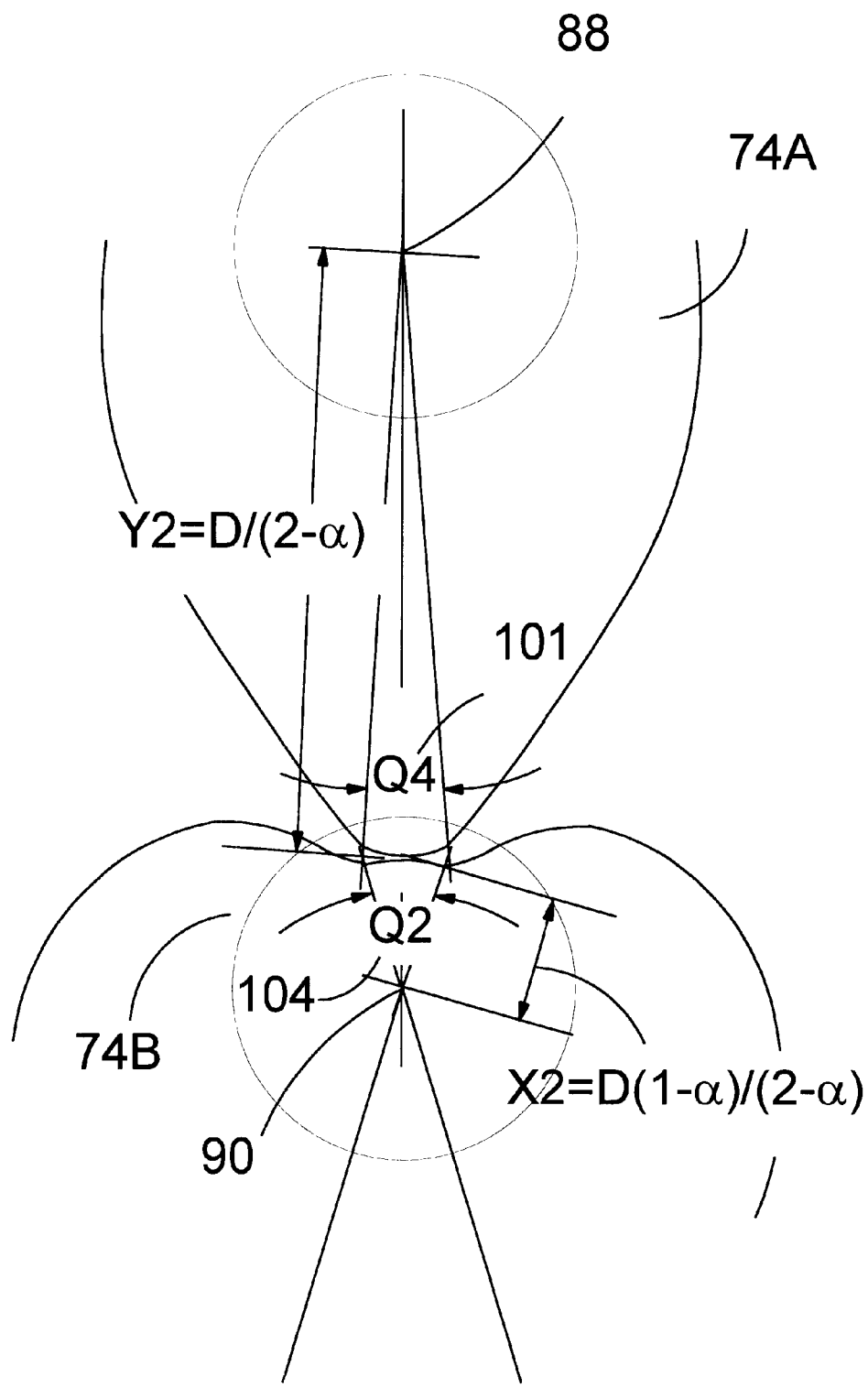
FIG. 10 is a detailed view of gear geometries near the rotational axis of the type 2 gear.

Reference now is made to FIG. 9 of the drawings wherein geometries of the noncircular gear set 74 with no gear teeth (or gear bodies of gear set 74) are depicted in detail. FIG. 10 shows details of the gear geometries in the vicinity of the rotational axis 90 of the type 2 gear 74B. Noncircular gear sets 74 and 76 are of the same design so that a detailed description of only one is required. In FIG. 9, gear set 74 is shown in the position illustrated in FIG. 1, which is 180 degrees out of phase with gear set 76. As will become apparent hereinbelow, the degree to which gear sets 74 and 76 are rotationally out of phase varies continuously during engine operation. As viewed in FIG. 9, gears 74A and 74B rotate in the direction of arrows 94 and 96, respectively.

The geometries of type 1 and type 2 gears 74A and 74B are determined by the maximum and minimum rotational speeds of type 1 gear 74A relative to the rotational speed of type 2 gear 74B, the angle traveled by type 2 gear 74B while type 1 gear 74A is traveling at these extreme rotational speeds, and the speed profile of type 1 gear relative to the rotational speed of type 2 gear 74B between the two extreme rotational speeds.

Let

Y1=radius of circular arc segment 100 of type 1 gear 74A in which the type 1 gear operates at maximum speed (FIG. 9), Y2=radius of circular arc segment 101 of type 1 gear 74A in which the type 1 gear operates at minimum speed (FIG. 10), X1=radius of circular arc segment 102 of type 2 gear 74B in which it meshes with the type 1 gear operating at maximum speed (FIG. 9), X2=radius of circular arc segment 104 of type 2 gear 74B in which it meshes with the type 1 gear operating at a minimum speed (FIG. 10), and D=distance between the centers of the rotational axes of the type 1 and type 2 gears (FIG. 9).

Then, X1+Y1=D, and X2+Y2=D. If we set alpha=(W0−Wmin)/AW0, then, Y1, Y2, X1, and X2 are expressed in D and alpha as:

$$Y1 = D/(2+\text{alpha}), \quad (2)$$

$$Y2 = D/(2-\text{alpha}), \quad (3)$$

$$X1 = D(1+\text{alpha})/(2+\text{alpha}), \quad (4)$$

and $$X2 = D(1-\text{alpha})/(2-\text{alpha}), \quad (5)$$

where alpha signifies Greek letter "alpha." In the noncircular curve segments of the type 1 gear, the distance between the rotational center and the point of contact with the type 2 gear varies from Y1 to Y2, and Y2 to Y1; and in the noncircular curve segments of the type 2 gear, the distance between the rotational center and the point of contact with the type 1 gear varies from X1 to X2 and X2 to X1. Y1, Y2, X1, and X2 defined in Equations (2) through (5) hold for all speed profiles.

In (2) through (5), "alpha" can take any value between 0 and 1. If alpha=1, the gears will become "perfect" heart- and teardrop-shaped gears, wherein Y1=D/3, Y2=D, X1=2D/3, and X2=0. If alpha=0, the gears become circular gears with equal radii, wherein Y1=Y2=X1=X2=D/2.

Y1 and X1 given in (2) and (4), respectively, are shown in FIG. 9, and Y2 and X2 given in (3) and (5), respectively, are shown in FIG. 10. In FIG. 9, Q0 (105) is the angle created by the type 1 gear's apex, the rotational center of the gear, and its point of contact with the type 2 gear; and at which point the speeds of the type 1 and type 2 gears all become equal; Q0 also is half the angle the type 1 gear travels (in the four piston engine) in the nonactive phase. We call angle Q0 the equi-speed angle. Q1 is the rotational angle of the noncircular segment 106 of the type 1 gear, and it is also the rotational angle of the noncircular segment 107 of the type 2 gear; Q2 is the rotational angle of each of circular segments 102 and 104 of the type 2 gear; Q3 is the rotational angle of the circular segment 100 of the type 1 gear; and Q4 is the rotational angle of the circular segment 101 of the type 1 gear. Here, Q3+Q4=2(Q2), and Q1+Q2=pi.

In the four-piston design, Q0 equals the angle of rotation of the trailing piston in the nonactive phase, and it also equals the sum of the thickness of a piston and the gap created by the two pistons when they are closest to each other; half of Q3 equals the rotational angle of the piston at maximum speed, and half of Q4 equals the rotational angle of the piston at minimum speed.

Type 1 and Type 2 Gear Geometries for a Special Case

With reference to FIG. 7 of the drawings, the geometries of type 1 and type 2 gears for a special case in which the type 1 gear follows a rotational speed profile that has sinusoidal curve segments and constant segments, and the type 2 gear operates at a constant speed are described below.

We define:

y=Varying radius of the type 1 gear—distance between the rotation center and the point of contact with the type 2 gear (not shown), x=Varying radius of the type 2 gear—distance between the rotation center and the point of contact with the type 1 gear (not shown), W0=Rotational speed of the type 2 gear (76B-S in FIG. 7), W=Rotational speed of the type 1 gear (76A-S in FIG. 7), Q=Rotational angle of the type 2 gear measured from the end of the circular segment with larger radius of the type 2 gear (variable on horizontal axis in FIG. 7, and 99 in FIG. 8), Q1=Total rotational angle of the type 2 gear in the noncircular segment and also the total rotational angle of the type 1 gear in the noncircular segment (FIG. 7), and Qy=Rotational angle of the type 1 gear measured from the end of the circular segment with smaller radius of the type 1 gear (98 in FIG. 8).

Between the rotational speed of the type 2 gear, W0, and the rotational speed of the type 1 gear, W, there exists a relationship such that:

$$xW0=(D-x)W \qquad (6)$$

In Equation (6), D is the distance between the rotational centers of the type 1 and 2 gears.

The rotational speed of the type 1 gear 76A in the noncircular segment that starts at the end of the circular segment with smaller radius (end of rotational speed Wmax) and ends at the beginning of the lareger radius (start of rotational speed Wmin) is expressed as:

$$W=W0+(W0-W\text{min})\cos [Q(pi)/Q1] \qquad (7)$$

Equation (7) reads W equals W0 plus (W0−Wmin) multiplied by cosine [Q multiplied by (pi) divided by Q1].

As we did previously, if we set alpha=(W0−Wmin)/W0, then from Equations (6) and (7), we have $$x=D\{1+(\text{alpha})\cos [Q(pi)/Q1]\}/\{2+[(\text{alpha})\cos [Q(pi)/Q1]\} \qquad (8)$$

and $$y=D-x=D/\{2+(\text{alpha})\cos [Q(pi)/Q1]\} \qquad (9)$$

From Equation (7) and W=dQy/dt and W0=dQ/dt, we obtain:

$$Qy=S(0, Q)\{1+(\text{alpha})\cos [Q(pi)/Q1]\}dQ \qquad (10)$$

where S in S(0, Q) signifies the integral symbol and (0, Q) the range of integration being 0 to Q. Equation (10) is rewritten as:

$$Qy=Q+(\text{alpha})[Q1/(pi)]\sin [Q(pi)/Q1] \qquad (11)$$

From Equations (9) and (11), we obtain:

$$Qy=[Q1/(pi)][\text{acos}(beta)]+(\text{alpha})[Q1/(pi)]\sin [\text{acos}(beta)] \qquad (12)$$

where acos=arc cosine, and beta=(D−2y)/[(alpha)y].

Thus, the relationship between Q and x for one of the noncircular segments of the Sakita type 2 gear as shown in (8), and relationship between Qy and y for corresponding noncircular segment of the Sakita type 1 gear as shown in (12), have been established. It must be apparent that the relationship shown in (8) holds for the other noncircular segment of the Sakita type 2 gear, and (12) holds for corresponding segment of the type 1 gear except that angles are measured in opposite directions. As mentioned earlier, type 1 and type 2 gears may be formed entirely of noncircular segments. Then, Q1=pi.

Figure 11:
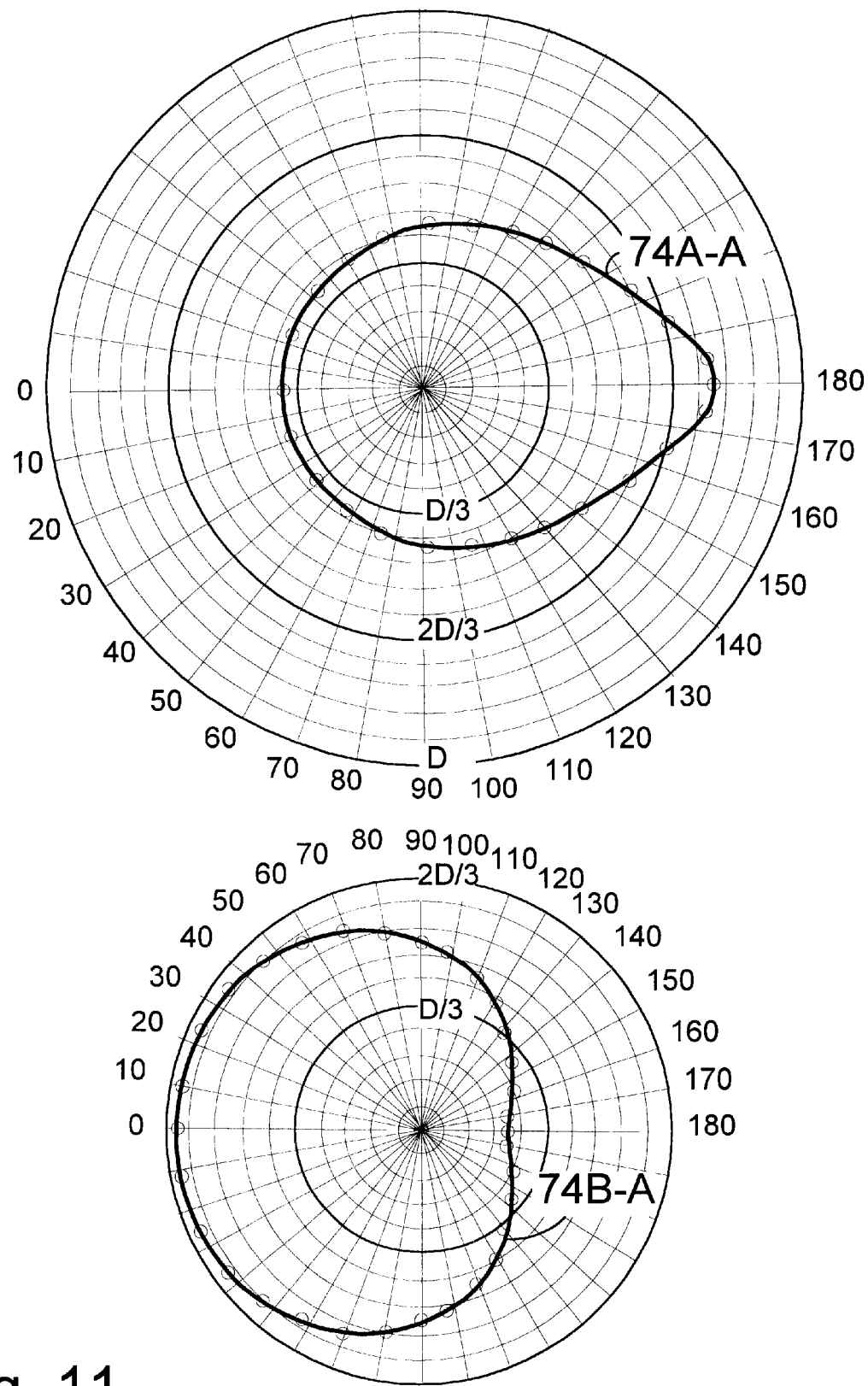
FIG. 11 is a diagram of a type 1 and type 2 gear set for alpha=0.7 with no gear teeth shown.

Reference now is made to FIG. 11 of the drawings wherein sample type 1 and type 2 gear designs 74A-A and 74B-A, respectively, are shown. The type 1 and type 2 gears shown in FIG. 11 are with alpha=0.7 and Q1=pi, in which the speed profile of the type 1 gear follows a sinusoidal curve with no constant speed segments. The type 1 gear 74A has a teardrop-shaped body with a round apex, and the corresponding type 2 gear 74B has a heart-shaped body with a round shallow cusp. In this example, the type 1 gear is formed with two noncircular segments, in each of which the radius (or the distance between the center of rotation to the contact point with the other gear) changes from 0.37D to 0.77D. The type 2 gear is formed with two noncircular arc segments, in each of which the radius (or the distance between the center of rotation to the contact point with the other gear) changes from 0.63D to 0.23D. As the value of alpha or the duration of constant-speed operation changes, the physical geometries of the type 1 and type 2 gears also change. Type 1 and type 2 gears with alpha=1.0 are perfect teardrop and heart shaped, with a sharp apex in the type 1 gear and a sharply cut cusp in the type 2 gear. As the value of alpha decreases, the apex of the type 1 gear loses sharpness, as does the concave segment of the type 2 gear, so they are no longer teardrop shaped or heart shaped at alpha values less than 0.6. Finally at alpha=0, type 1 and type 2 gears become circles with the same radius of 0.5D.

The type 1 and type 2 gears of both gear sets operate perfectly well under any speed variation of the type 2 gear, because rotational speeds of the type 1 gears has been defined relative to rotational speed of the type 2 gears, and thus, any increase/decrease in rotational speed of the type 2 gears will incur proportionately higher/lower rotational speed of the type 1 gears, and any increase/decrease in rotational angle traveled by the type 2 gears due to the rotational speed change within a given time period will incur proportionately higher/lower rotational angle traveled by the type 1 gears in the same time period.

Form Equation (1) and above discussion, it will be clear that if one gear set is meshing there is no requirement that the other gear set be meshing at the same time.

Construction of Type 1 and Type 2 Gears

Figure 12:
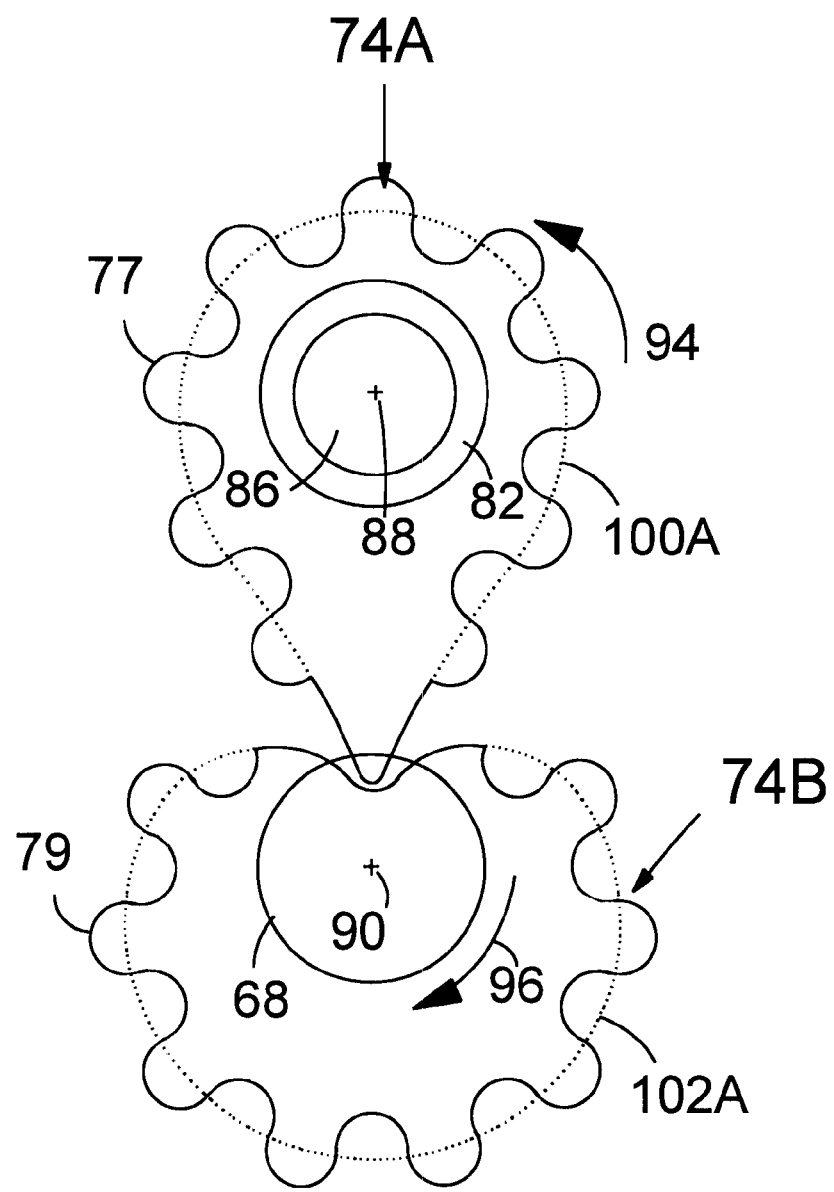
FIG. 12 is a diagram showing a type 1 and type 2 gear set.

Reference now is made to FIG. 12, wherein a gear set 74 comprising a type 1 gear 74A and a corresponding type 2 gear 74B is shown with outwardly extending round-shaped gear teeth 77 and 79 about the peripheries thereof. The type 1 gear 74A is shown affixed to tubular shaft 82 which, in turn, is rotatably supported on shaft 86 rotatable about shaft axis 88. Similarly, heart-shaped gear 74B is shown attached to shaft 68 rotatable about axis 90. The dotted line 100A of the type 1 gear 74A and dotted line 102A of the type 2 gear 74B, identified as pitch lines, and also the peripheries of gear bodies, represent the theoretical geometries of the type 1 and type 2 gears (i.e., gears without their gear teeth). Pitch line is a line that connects gear teeth's points of contact under special circumstance, in which the contact point is on the line that connects the rotational centers of the two gears.

The type 1 and type 2 gears contact each other at the sides of the gear teeth in segments where gear teeth are placed and at the body of the gears represented by the pitch lines near the apex of the type 1 gear and at the concave segment of the type 2 gear.

Figure 13:
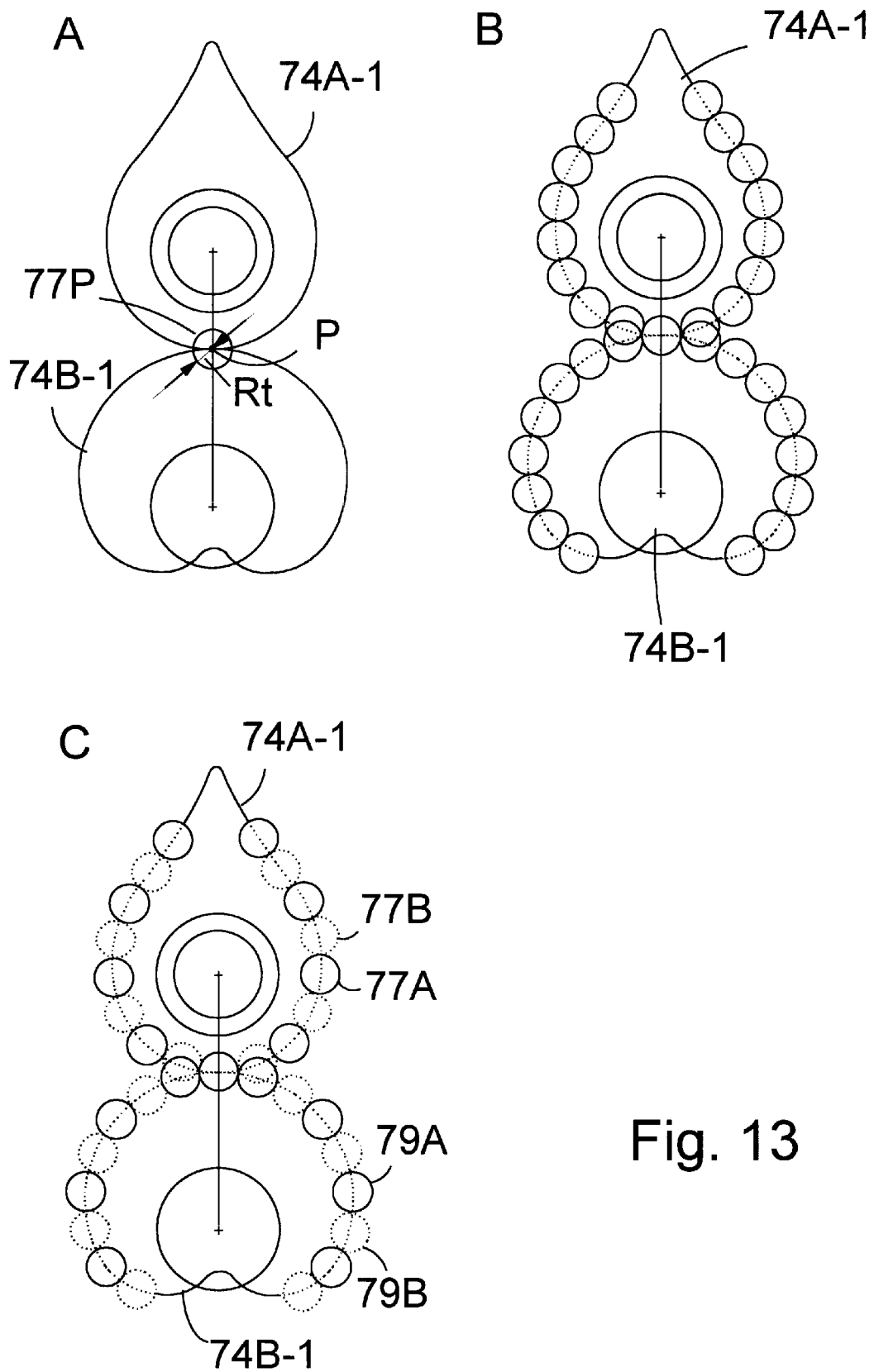
FIG. 13 is a diagram showing the process of arranging gear teeth of type 1 and type 2 gears.
Figure 14:
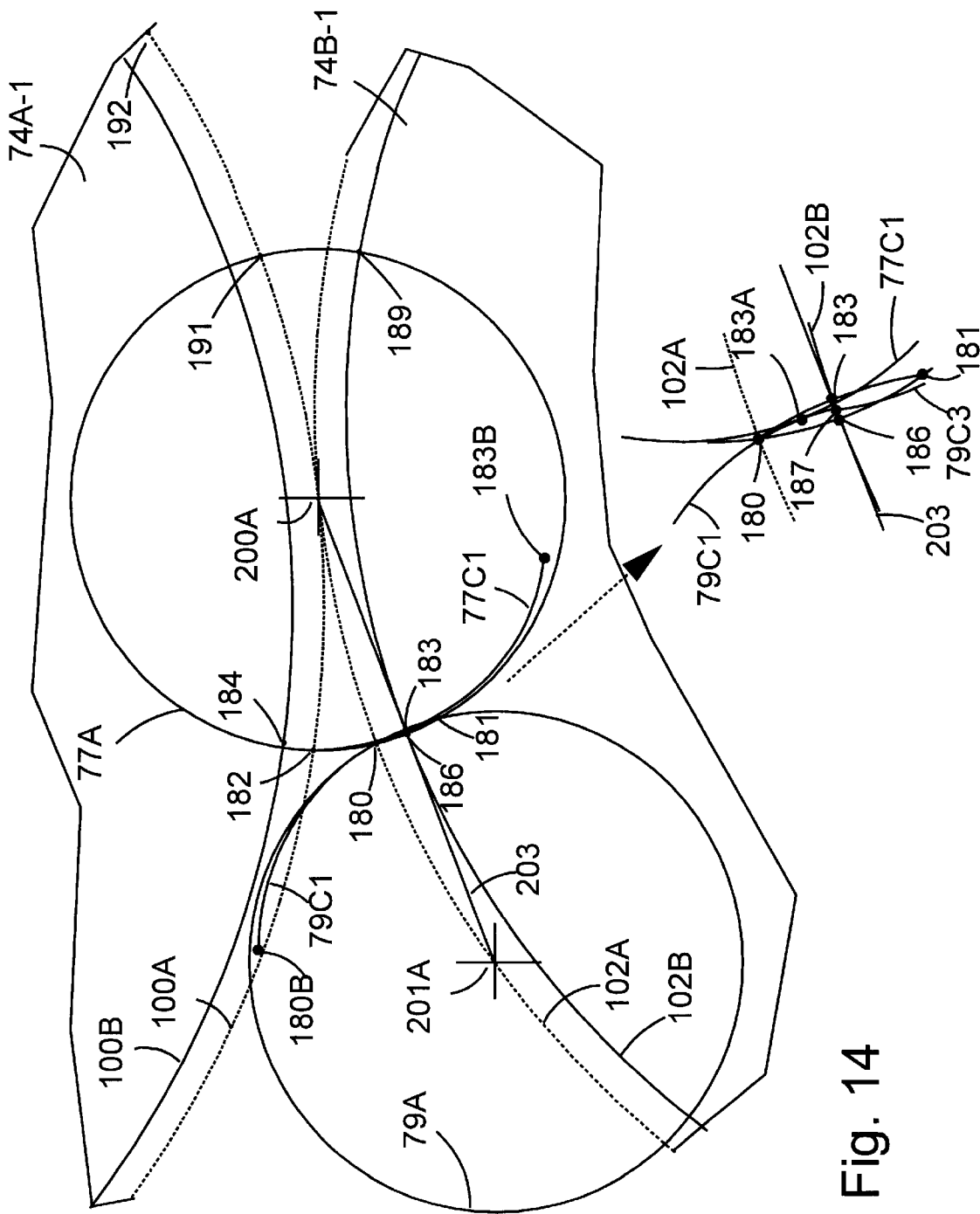
FIG. 14 is an enlarged view of curves involved in the type 1 and type 2 gears' teeth, with a detailed view of a selected area.
Figure 15:
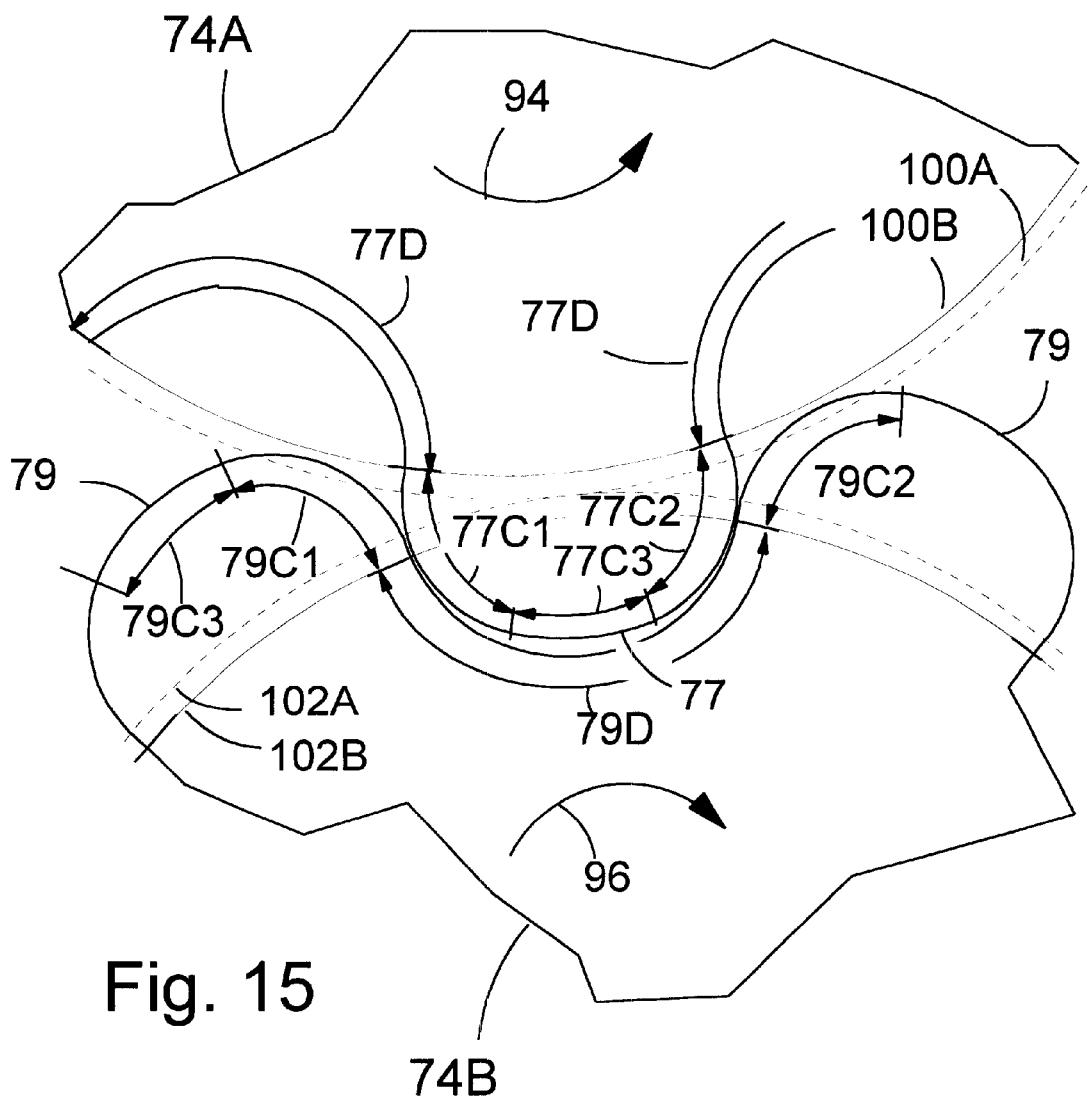
FIG. 15 is an enlarged view showing the meshing of type 1 and type 2 gears.

The gear design may be best understood by describing the step-by-step process involved in arranging the gear teeth of the type 1 and type 2 gears with reference to FIGS. 13 through 15 of the drawings. First, reference is made to FIG. 13 of the drawings. In describing FIG. 13, the letters A through C in parentheses in the text match the view letters A through C in FIG. 13. (A) Place the body 74A-1 of the type 1 gear 74A, and gear body 74B-1 of the type 2 gear 74B so that they are 180 degrees out of phase from their position in FIG. 12 of the drawings, and draw circle 77P with radius Rt, which is half the width of the planned tooth width, with its center at point P, shared by the peripheries of both 74A and 74B gear bodies. (B) Draw circles of radius, Rt, next to each other with no space in between and with the center of each circle on the peripheries of the gears, such that neighboring circles intersect at two points, (points 180 and 181 shown in FIG. 14) one of which points (point 180) is on the periphery of the gear body, or pitch line, of each gear. (C) Identify every other circle in each gear body periphery as a solid line for gear teeth and alternate circles as a dotted line for gaps between teeth.

Reference is now made to FIG. 14 of the drawings showing an expanded view of two neighboring circles with their centers on 100A and 102A, wherein circle 77A is on the periphery 100A of gear body 74A-1, and circle 79A is on the periphery 102A of gear body 74B-1. Circles 77A and 79A intersect at 180, which is on the pitch line 102A, and at 181. The straight line 203 connecting centers 200A and 201A of circles 77A and 79A, respectively, intersects with circle 79A at point 183 and with circle 77A at 186 as shown in the inserted enlarged view. The line 102B represents the trajectories of the maximum overlapping points, such as 183 and 186, and is identified as base line of gear 74B. The line 100B, which is drawn in a similar manner, is identified as base line of gear 74A. An involute or similar curve 77C1 that forms a side of a tooth in gear 74A starts at point 184 (which is not on circle 77A) on line 100B, and intersects with line 100A at point 182, which is on circle 77A. Similarly, an involute or similar curve 79C1 that forms a side of a tooth in gear 74B starts at point 187 in the inserted enlarged view (which is not on circle 79A) on line 102B, and intersects with line 102A at 180, which is on circle 79A. In FIG. 14, Lines 77C1 and 79C1 contact each other at 183A. 77C1 and 79C1 each may comprise two or more curve segments of different mathematical characteristics. The involute or similar curve 77C1 is terminated at an arbitrary point 183B which is on or within circle 77A. Similarly, the involute or similar curve 79C1 is terminated at an arbitrary point 180B which is on or within circle 79A. The points of termination 180B and 183B of the involute or similar curves 77C1 and 79C1 are the boundaries of the side and the top segments of gear teeth. Geometries of the curves 77C1 and 79C1 are selected to satisfy the condition such that curves 77C1 and 79C1 will generally in contact to each other while they travel the distance of a full gear tooth width (i.e., 201 to 200A in FIG. 14).

The gear teeth in the completed gear design are shown in FIG. 15 of the drawings. Surface of gear tooth 77 of gear 74A comprises two sides 77C1 and 77C2 and top 77C3, and surface of gear tooth 79 of gear 74B comprises two sides 79C1 and 79C2, and top 79C3. The top surface 77C3 of gear tooth 77A is within circle 77A, and the top surface 79C3 of gear tooth 79A is within circle 79A in FIG. 14. A gap between neighboring gear teeth 77 is shown as 77D, and a gap between neighboring gear teeth 79 is shown as 79D. The boundary between a gear tooth side 79C1 and gap 79D is shown by point 187 in the inserted enlarged view. The curves forming gaps 77D and 79D are arbitrary curves that do not cause interference of gear teeth.

Figure 16:
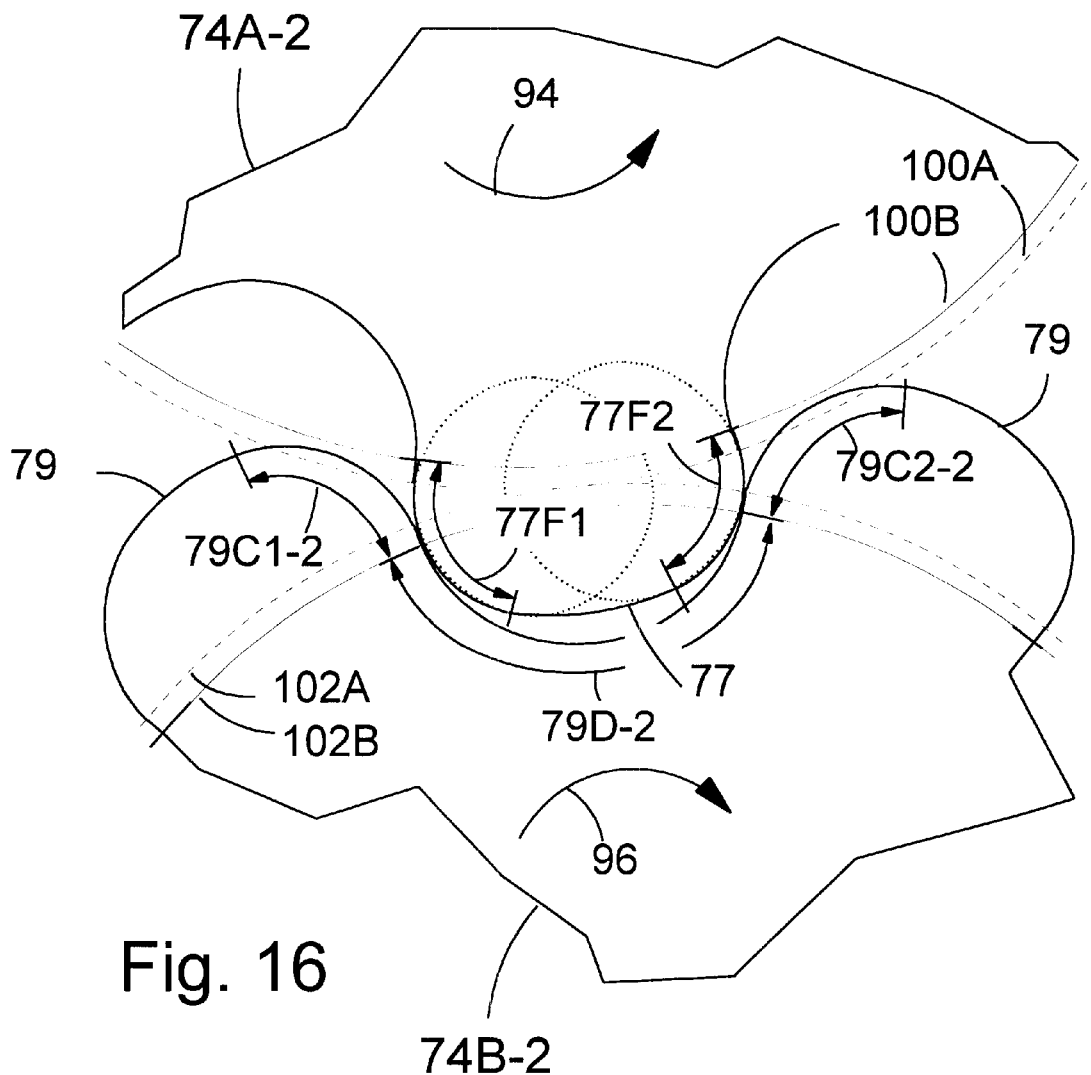
FIG. 16 is an enlarged view showing the meshing of modified type 1 and type 2 gears.

FIG. 16 of the drawings shows a modified gear tooth design wherein the involute or similar curve 77C1 shown in FIG. 15 is replaced by a circular arc 77F1, and the involute or similar curve 77C2 is replaced by another circular arc 77F2. The geometric designs of the corresponding gear tooth arcs 79C1-2 and 79C2-2 must be adjusted to accommodate the circular geometries of gear tooth arcs 77F1 and 77F2. This is the basis for an alternative gear set design, in which one of the gears will have rollers instead of teeth.

Reference now is made to FIGS. 17 and 18 of the drawings, wherein an alternative gear set 120 comprising a modified form of the type 1 gear 120A and corresponding type 2 gear 120B is shown, which gear set may be used in place of gear sets 74 and 76. The type 1 gear 120A is shown affixed to tubular shaft 82, which, in turn, is rotatably supported on shaft 86, rotatable about shaft axis 88, in the manner of gear set 74 shown in FIG. 12. Similarly, type 2 gear 120B is shown attached to shaft 68 rotatable about axis 90. In this embodiment, the type 1 gear 120A uses rollers and the type 2 gear 120B uses a nonroller gear tooth design. Rollers 132A of the type 1 gear mesh only with gear teeth 124A of the type 2 gear and rollers 132B mesh only with gear teeth 124B.

Having two rollers in the same plane is not feasible, so gears 120A and 120B are split into two one-sided gears, each gear having teeth for meshing only on one side. That is, each gear's teeth of the two one-sided gears are angularly offset so that the two one-sided gears mesh only on one side to function as one gear set.

FIG. 18 shows that type 1 gear 120A comprises one-sided gears 120AA and 120AB with rollers 132A and 132B sandwiched between walls 128. Gear teeth in the form of rollers 132A and 132B are located on the periphery of the gear and are rotatably supported on axles 134A and 134B extending between the gear walls 128. The type 2 gear 120B comprises one-sided gears 120BA and 120BB with gear teeth 124A and 124B attached with connecting piece 126. Rollers 132A and 132B are adapted for engagement with teeth 124A and 124B, respectively, formed about the periphery of the type 2 gear. Gear tooth 132A of type 1 one-sided gear 120AA and gear tooth 124A of type 2 one-sided gear 120BA, and gear tooth 132B of type 1 one-sided gear 120AB and gear tooth 124B of one-sided gear 120BB continuously contact each other while they travel one full gear tooth width in the vicinity of the contact point.

Gear sets that include a combination of nonroller gear teeth and roller types of teeth may be used. For example, the circular arc sections of gears 120A and 120B may be provided with nonroller gear teeth in place of the illustrated roller types of teeth 132A and 132B on gear 120A and associated teeth 124A and 124B on gear 120B.

Asymmetric Type 1 and Type 2 Gears

Figure 20:
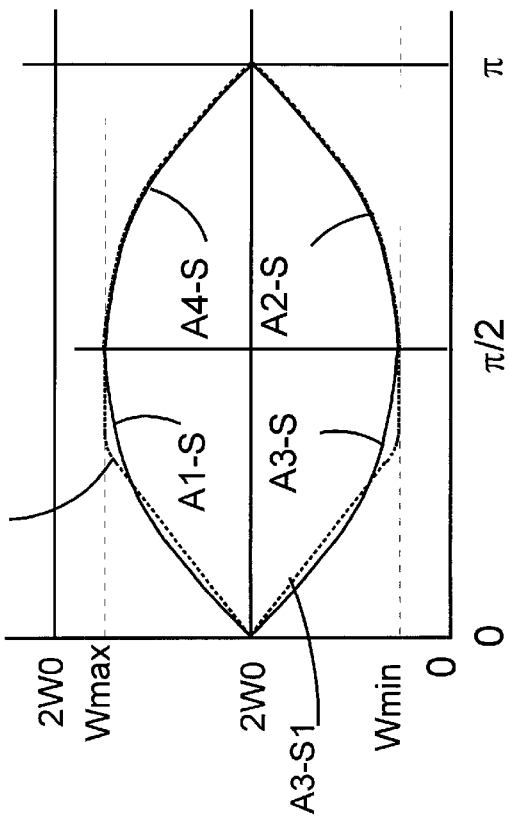
FIG. 20 is a diagram showing the rotational speed profile of type 1 and type 2 gears.
Figure 19:
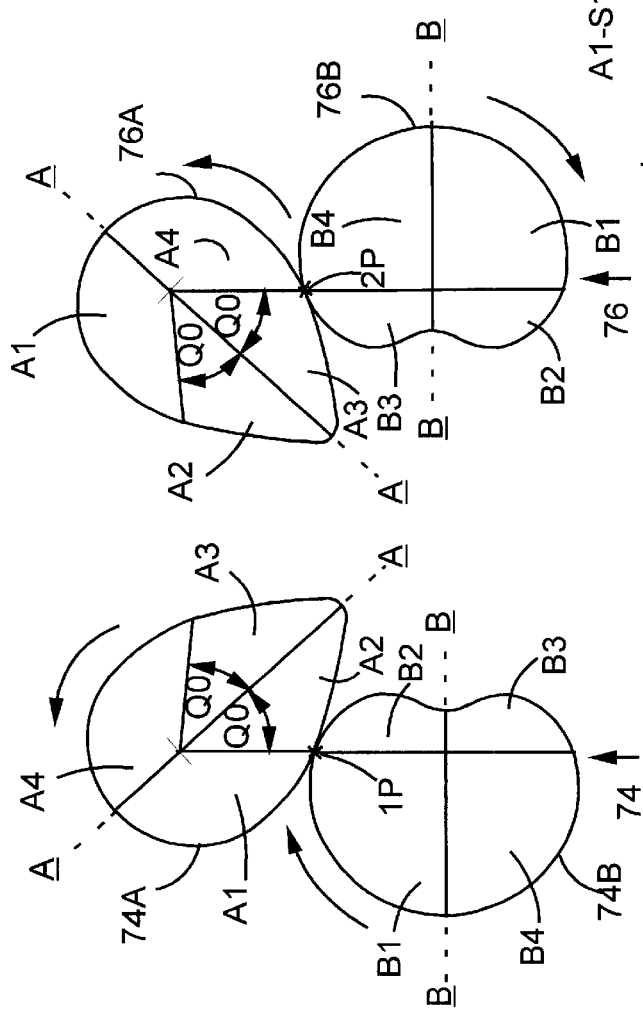
FIG. 19 is a diagram of type 1 and type 2 gears with no gear teeth shown.

Reference now is made to FIG. 19 of the drawings, comprising type 1 gears 74A and 76A, each having gear segments A1, A2, A3, and A4 and type 2 gears 74B and 76B, each having gear segments B1, B2, B3, and B4, wherein segment A1 meshes with B1, A2 with B2, A3 with B3, and A4 with B4. The four segments in type 1 gear 74A and 76A are defined in such a manner that at the boundary of A1 and A2, denoted by 1 P in FIG. 19, the rotational speed of the type 1 gear equals the rotational speed of the type 2 gear; at the boundary of A2 and A3, the rotational speed of the type 1 gear is the minimum; at the boundary of A3 and A4, denoted by 2P in FIG. 19, the rotational speed of the type 1 gear equals the rotational speed of type 2 gear; and at the boundary of A4 and A1, the rotational speed of the type 1 gear is the maximum. Speed profiles of these four segments of type 1 gears (i.e., A1, A2, A3, and A4) are denoted by A1-S, A2-S, A3-S, and A4-S, respectively, in FIG. 20. In FIG. 20, x-axis is the rotational angle of the type 2 gears 74B and 76B, and the y-axis is the rotational speeds of the type 1 and type 2 gears. The rotational angle of gears 74B and 76B is zero when gear set 74 is meshing at 1P, and gear set 76 is meshing at 2P.

Type 1 and type 2 gears are not necessarily symmetric to A—A and B—B. It must satisfy, however, in addition to the condition given in Equation (1), the angle traveled by the type 1 gear in A1 equals the angle traveled by the type 1 gear in A4, and the angle traveled by the type 1 gear in A2 equals the angle traveled by type 1 gear in A3, both under constant speed operation of the type 2 gear. For example, a type 1 gear that causes speed profiles A1-S1, A2-S, A3-S1, and S4-S shown in dotted line in FIG. 20 satisfying the above conditions is a valid design.

Operation of the Engine

Figure 21:
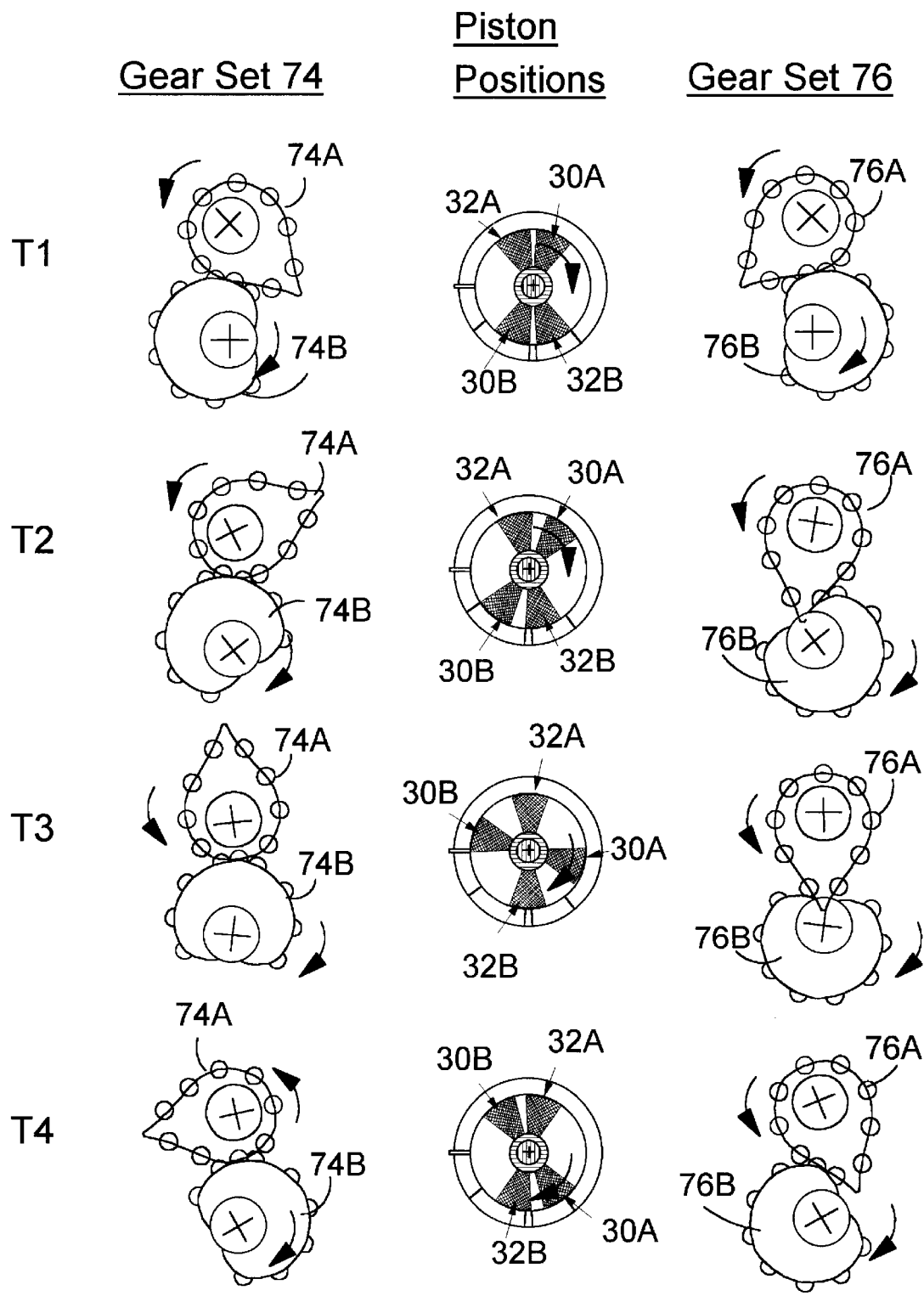
FIG. 21 is a diagram showing the relationship between piston positions and type 1 and type 2 gear positions.

Operation of the novel engine of this invention will best be understood with reference also to FIGS. 21 and 7. Reference first is made to FIG. 21 wherein sequential operating positions of the engine pistons and gear sets 74 and 76 at four time points T1 through T4 are schematically illustrated, and functions at the four engine subchambers are identified. Each subchamber is identified by the leading and trailing pistons of the subchamber.

In the illustrated engine operation, fuel is injected during the compression phase. Alternatively, fuel may be injected at the end of the compression phase. Furthermore, a fuel/air mixture may be supplied to the engine through the inlet port, in which case no fuel injection means are required.

FIG. 21 shows the angular positions of the piston assemblies 30 and 32 and gear sets 74 and 76 of a four-piston engine during almost one revolution of the piston assemblies. Since the gear sets 74 and 76 are connected to the piston assemblies through circular gear pairs 70 and 72 having a 1:2 gear ratio, in the four-piston design the type 1 gears 74A and 76A and type 2 gears 74B and 76B complete two revolutions for each revolution of the piston assemblies and output shaft 86 also completes two revolutions for each revolution of the piston assemblies.

In FIG. 21, at T1, pistons 30A and 32A are at their closest positions and subchamber 30A–32A is at its minimum volume; ignition has already taken place in subchamber 30A–32A. The exhaust of spent gases starts through the exhaust port at subchamber 32B–30A. The power and exhaust phases occurring at the respective subchambers 30A–32A and 32B–30A continue from time point T1 through time point T4 of the engine cycle in FIG. 21. Fuel is injected into subchamber 32A–30B at some point in piston travel. The exhaust port may be cut wider than the piston width to allow for the exhaust of spent gases before time point T1. Spark ignition timing may be advanced or delayed as required.

At T1 in FIG. 21, gear sets 74 and 76 are both rotating at the same speed. Reference is now also made to FIG. 7 a diagram showing the rotational speed profiles of gears 74A and 76A and interconnected gears 74B and 76B. In FIG. 7, the rotational speeds of type 1 gears 74A and 76A are identified by reference characters 74A-S and 76A-S, respectively, and the rotational speeds of type 2 gears 74B and 76B are identified by reference characters 74B-S and 76B-S, respectively. In FIG. 7, times T1 to T4 are shown, which correspond to times T1 to T4 in FIG. 21. As seen in FIG. 7, at time T1, the type 1 and type 2 gears are rotating at speed W0. During the time period between T1 and T2 of FIG. 7, the rotational speed of gear 74A increases, while the rotational speed of gear 76A decreases. At time T2 in FIG. 21, compression and intake start in subchambers 32A–30B and 30B–32B, respectively. Expansion and exhaust activities have been in progress. During the time period between T2 and T3 of FIG. 7, the rotational speed of gear 74A further increases and reaches the maximum speed, Wmax, while the rotational speed of gear 76A further decreases and reaches the minimum speed, Wmin. By time T3 of FIG. 7, both gear sets 74 and 76 have reached constant rotational speed and have been rotating at those constant speeds for a while. Type 1 gears 74A and 76A are rotating at speed Wmax and Wmin, respectively, at time T3 shown in FIG. 7. The rotational speed 74A-S of type 1 gear 74A decreases, and simultaneously, the rotational speed 76A-S of type 1 gear 76A increases between times T3 and T4. At time T4 of FIG. 21, ignition takes place in subchamber 32A–30B, in preparation for the next cycle.

Alternative Working Chamber Design

Figure 22:
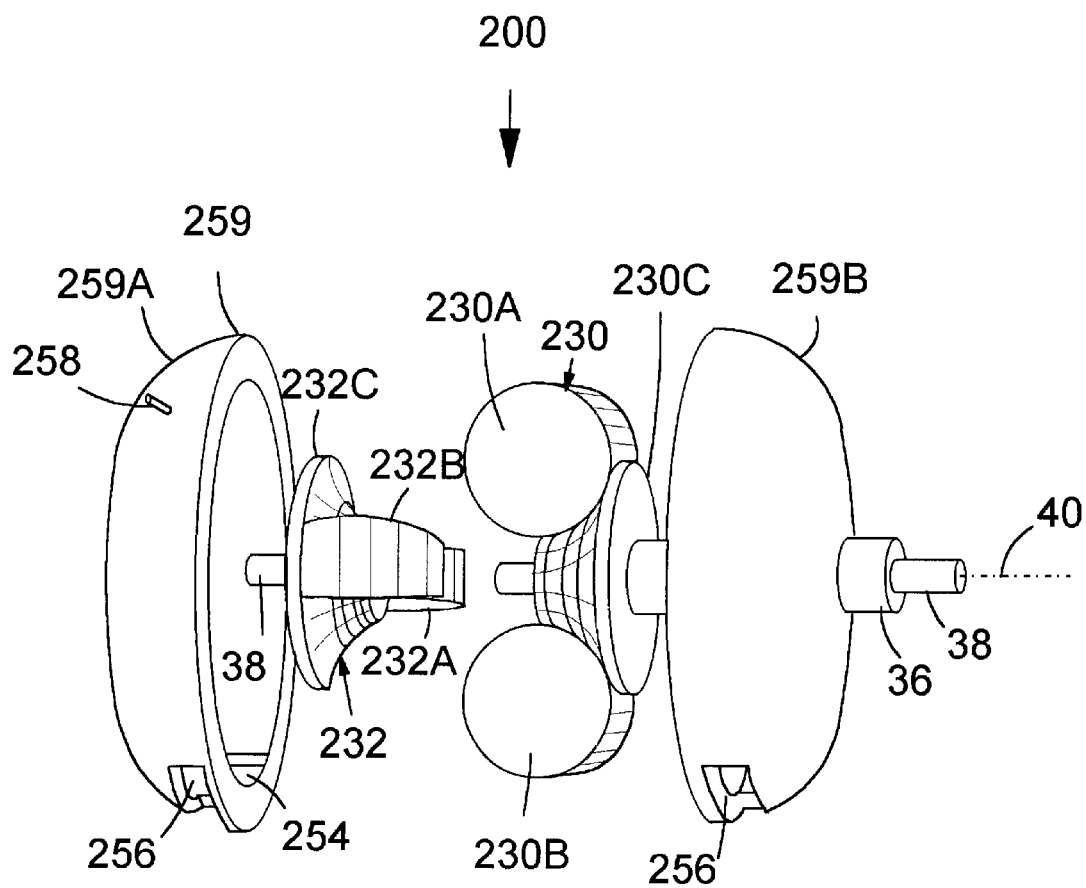
FIG. 22 is an exploded isometric view of a rotary piston engine's working chamber in an alternative embodiment of the present invention.

Reference is now made to FIG. 22 of the drawings wherein an alternative design of engine 200 is shown to include a stationary engine housing 259 having a toroidal working chamber within. The engine housing 259 comprises housing walls 259A and 259B, attached by means such as bolts, not shown. The piston assemblies 230 and 232 in this embodiment of the invention are practically of the same design described earlier and shown in FIG. 2 except that the piston hubs of this embodiment are smaller than that described in FIG. 2.

The engine housing 259 has an exhaust port 254, followed, in the direction of piston travel, by an intake port 256, which is generally wider than the piston. Next, in the direction of piston travel, a fuel injection nozzle 258 is provided that is connected to a source of fuel, and through this nozzle fuel is injected into the subchambers. Piston assembly 230 includes a pair of diametrically opposed pistons 230A, 230B, and piston hub 230C. Piston assembly 232 includes a pair of diametrically opposed pistons 232A, 232B, and piston assembly 232C. Pistons 230A and 230B are affixed to outer piston shaft 36 through piston hub 230C. An inner piston shaft 38 is rotatably mounted on the tubular shaft 36. Pistons 232A and 232B of second piston assembly 232 are attached to inner piston shaft 38 through piston hub 232C at diametrically opposite positions. Piston assemblies 230 and 232 are rotatable about a common axis 40.

The working chamber is divided into two pairs of diametrically opposed subchambers by four pistons 230A, 230B, 232A, and 232B in a four-piston engine as shown in FIG. 22. Each piston assembly alternately rotates at a faster and slower speed such that trailing pistons rotate at a slower speed than leading pistons during the power and intake phases of engine operation, and periodically variable volume subchambers are provided between adjacent pistons.

Figure 23:
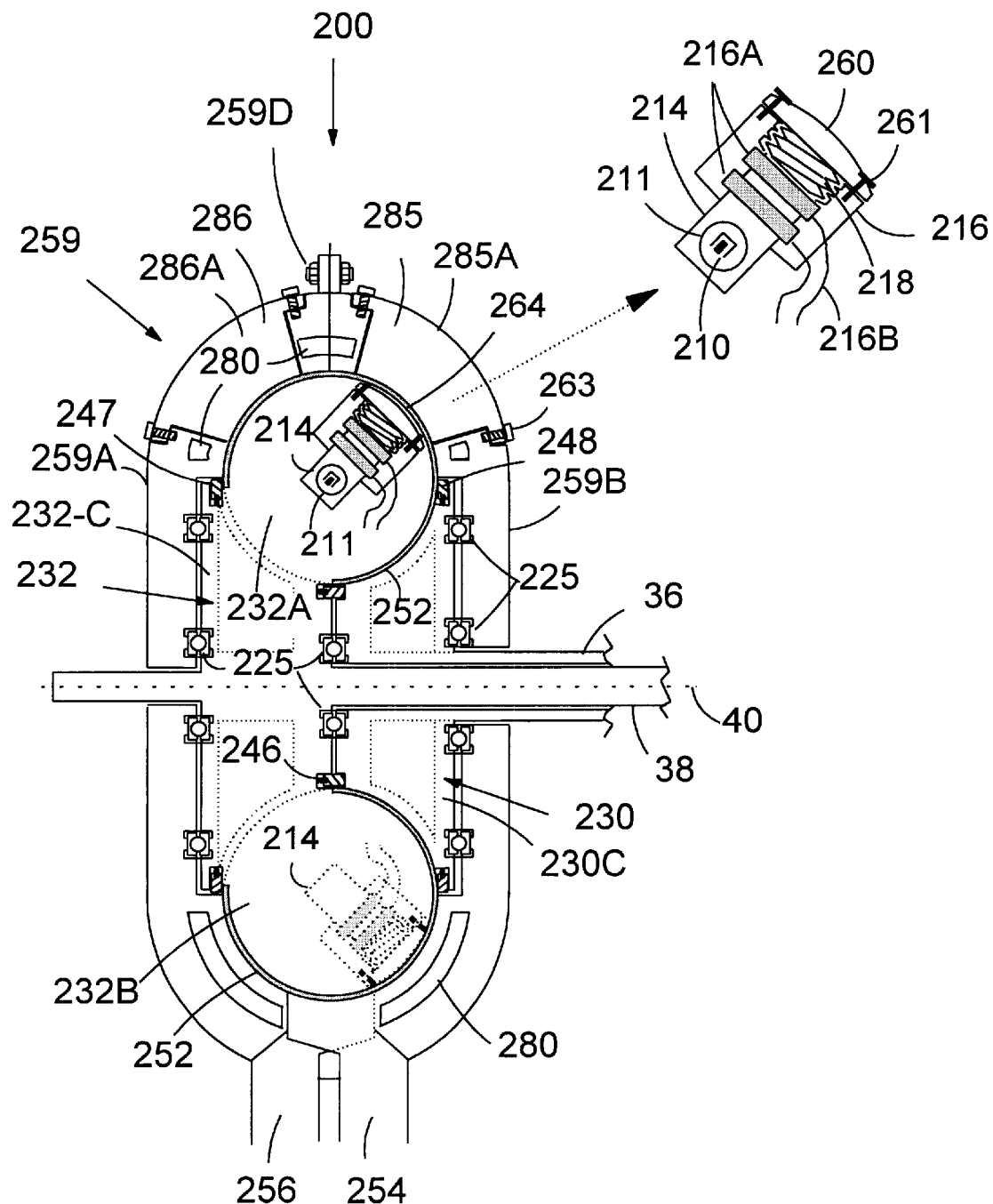
FIG. 23 is a cross-sectional view of an alternative design of the engine's working chamber.

Reference is now made to FIG. 23 of the drawings showing a cross-sectional view of the engine's working chamber with an enlarged view of a spark plug 214 installed within piston 232A. A spark plug 214 is embedded inside a hole 264 drilled in each piston (a spark plug embedded in 232A is shown in solid line and a spark plug embedded in 232B is shown in dotted line) between piston rings 252; through this hole, the spark plug 214 can be accessed. A hole 211 is bored in the middle of one side of the piston surface through which the spark plugs' electrodes with spark gaps 210 communicate with a subchamber. Spark plug 214 is plugged to spark plug socket 216 made of a nonconductive material and equipped with power terminals 216B from which an electric wire is extended to the power source, not shown. Spark plug 214 is secured in its place by a screw 218. Spark plug hole 264, in which the spark plug case 216 is embedded is closed off by a lid 260 with bolts 261. The engine housing wall 259A has a spark plug maintenance hole 285 for accessing the spark plugs 214, which is closed off by a lid 258A with bolts 263. The spark plug cases and spark plugs attached to pistons 232A and 232B are accessible from opening 285 on the engine housing wall 259A whenever necessary. A spark plug is provided for each of the subchambers into which the working chamber is divided by the pistons. A spark plug 214 and its peripheral parts that are housed in piston 232B are shown in dotted line. Similarly, spark plugs (not shown) embedded in pistons 230A and 230B are accessible through a spark plug maintenance hole 286 which is closed off by a lid 286A under normal operation.

Sealing of subchambers to prevent the flow of gases therebetween is provided by any suitable means, including for example, semicircular piston rings 252 along the outer convex surfaces of pistons 232A and 232B. Circular seal means 247 and 248 are placed along the crevices between each of the pistons and the inner surface of engine housing wall for sealing engagement. Similarly, a circular seal means 246 is placed along the crevices between the pistons at the inner wall of the engine housing 259 for sealing engagement between the two pistons.

Ball bearings 225 are placed between piston assemblies 230 and 232, and between piston assembly 230 and the engine housing 259 for secure but rotatable mounting of the piston assemblies. The engine housing 259 is equipped with a water jacket 280; the pump that pumps cooling water into the water jacket is not shown.

FIGS. 24A and 24B of the drawings show, using mathematical notations and commonly used Greek letters for some variables and constants, aforementioned Equations (1) through (12).

The invention having been described in detail in accordance with the requirements of the U.S. Pat. Statutes, various other changes and modification will suggest themselves to those skilled in this art. For example, the shape of the piston surface may be made rectangular or square instead of circular as described in the present invention, and the shape of the working chamber may be cylindrical instead of toroidal. The engine described in this invention may be also used in diesel engines. No. of pistons attached to a piston assembly may not be limited to four or eight: As many pistons as desired may be attached to a piston assembly as long as gear set 70 and 72 shown in FIG. 1 is adjusted to a proper rotation ratio; i.e., 2:1 in the four-piston engine, 4:1 in the eight-piston engine, etc., and the number of pistons attached to a piston assembly is a multiple of four. The use of the specified gear teeth is not required for operation of the engine. It is intended that the above and other such changes and modifications shall fall within the spirit and scope of the invention defined in the appended claims.

I claim:

1. An internal combustion engine comprising,
    engine housing walls, a working chamber, inlet and exhaust ports, first and second piston assemblies each of which assemblies includes at least one pair of diametrically opposite pistons within said working chamber rotatable about a rotational axis of said piston assemblies and dividing said working chamber into a plurality of pairs of diametrically opposed subchambers,
    means for interconnecting said first and second piston assemblies for variablespeed rotation of the first and second piston assemblies in the same direction during recurrent periods of rotation such that at least one pair of diametrically opposed subchambers decreases in volume while at least one other pair of diametrically opposed subchambers increases in volume,
    for each complete revolution of the first and second piston assemblies a plurality of operating cycles are completed, each operating cycle including successive power, exhaust, intake, and compression phases,
    said piston assemblies include spark plugs having electrodes with spark gaps in communication with each subchamber for initiating power phases, and
    said housing wall having a spark plug maintenance hole for access to said spark plugs.

2. The internal combustion engine as defined in claim 1 wherein said piston assemblies include pistons formed with holes, each of which holes aligns with one of said spark plug maintenance holes at one point during a full rotation of each of said piston assemblies for removal and replacement of said spark plugs.

3. The internal combustion engine as defined in claim 2 wherein said holes formed in said pistons extend through piston hubs included in said piston assemblies.

4. The internal combustion engine as defined in claim 1 wherein said interconnecting means includes first and second gear sets each of which gear sets comprises
    two pairs of the intermeshing Sakita type 1 and type 2 gears,
    means for rotatably coupling the Sakita type 1 gears of the first and second gear sets to the respective first and second piston assemblies, and
    means for connecting the Sakita type 2 gears of said first and second gear sets to each other for simultaneous rotation thereof in an out-of-phase relationship.

5. The internal combustion engine as defined in claim 4 wherein said interconnecting means includes differential means having first and second inputs and an output, said first and second inputs being attached to said Sakita type 1 gears of said first and second gear sets, respectively, and
    means for rotatably coupling said differential means output to said Sakita type 2 gears for simultaneous rotation thereof.

6. The internal combustion engine as defined in claim 1 wherein each of said piston assemblies includes only one pair of diametrically opposed pistons.

7. The internal combustion engine as defined in claim 1 wherein each of said piston assemblies includes two pairs of diametrically opposed pistons.

8. The internal combustion engine as defined in claim 1 including an intake port cut wider in the direction of travel than the piston width,
    one of said subchambers defining a compression subchamber and a diametrically opposed subchamber defining an exhaust subchamber, and
    said compression subchamber having a volume smaller than said exhaust subchamber at maximum volume of said subchambers.

9. The internal combustion engine as defined in claim 1 including an exhaust port cut wider in the direction of piston travel than the piston.

10. The internal combustion engine as defined in claim 1 including an exhaust port and a means at said exhaust port for scavenging remaining exhaust gas in said exhaust subchamber.

11. An internal combustion engine comprising,
    engine housing walls, a working chamber, inlet and exhaust ports, first and second piston assemblies each of which assemblies includes at least one pair of diametrically opposed pistons within said working chamber rotatable about a rotational axis of said piston assemblies and dividing said working chamber into a plurality of pairs of diametrically opposed subchambers,
    means for interconnecting said first and second piston assemblies for variable-speed rotation of said first and second piston assemblies in the same direction during recurrent periods of rotation such that at least one pair of diametrically opposed subchambers decreases in volume while at least one other pair of diametrically opposed subchambers increases in volume,
    for each complete revolution of the first and second piston assemblies a plurality of operating cycles are completed, each operating cycle including successive power, exhaust, intake, and compression phases, said Sakita type 1 gears of first and second piston assemblies do not stop rotation at any moment while in operation, said interconnecting means includes first and second gear sets each of which gear set comprises noncircular Sakita type 1 and type 2 gears, wherein radius Y1 of circular arc segment of said Sakita type 1 gear, in which said Sakita type 1 gear operates at maximum speed, is defined as Y1=D/(2+alpha), radius Y2 of circular arc segment of said Sakita type 1 gear, in which said Sakita type 1 gear operates at minimum speed, is defined as Y2=D/(2−alpha), radius X1 of circular arc segment of said Sakita type 2 gear, in which said Sakita type 2 gear meshes with Sakita type 1 gear operating at maximum speed, is defined as X1=D(1+alpha)/(2+alpha), and radius X2 of circular arc segment of said Sakita type 2 gear, in which said Sakita type 2 gear meshes with Sakita type 1 gear operating at minimum speed, is defined as X2=D(1−alpha)/(2−alpha), wherein D=distance between the centers of the rotational axes of said Sakita type 1 and type 2 gears, wherein alpha=(W0−Wmin)/W0, wherein W0=rotational speed of said type 2 gear, and
Wmin=minimum rotational speed of said Sakita type 1 gear, in the noncircular curve segments of said Sakita type 1 gear, the distance between the rotational center and the point of contact with said Sakita type 2 gear varies from Y1 to Y2, and Y2 to Y1, in the noncircular curve segments of said Sakita type 2 gear, the distance between the rotational center and the point of contact with said Sakita type 1 gear varies from said X1 to said X2 and said X2 to said X1, and rotational speed profile of said Sakita type 1 gear, expressed as a function of rotational angle of said Sakita type 2 gear includes a nonlinear segment in at least one of its noncircular segments.

12. The internal combustion engine as defined in claim 11 wherein each of said piston assemblies includes only one pair of diametrically opposed pistons.

13. The internal combustion engine as defined in claim 11 wherein each of said piston assemblies includes two pairs of diametrically opposed pistons.

14. The internal combustion engine as defined in claim 11 including an intake port cut wider in the direction of travel than the piston width, one of said subchambers defining a compression subchamber and a diametrically opposed subchamber defining an exhaust subchamber, and said compression subchamber having a volume smaller than said exhaust subchamber at maximum volume of said subchambers.

15. The internal combustion engine as defined in claim 11 including an exhaust port cut wider in the direction of piston travel than the piston.

16. The internal combustion engine as defined in claim 11 including an exhaust port and a means at said exhaust port for scavenging remaining exhaust gas in said exhaust subchamber.

17. The internal combustion engine defined in claim 11 wherein said interconnecting means includes differential means having first and second inputs and an output, said first and second inputs being attached to said Sakita type 1 gears of said first and second gear sets, respectively, and means for rotatably coupling said differential means output to said Sakita type 2 gear for simultaneous rotation thereof.

18. An internal combustion engine comprising, engine housing walls, a working chamber, inlet and exhaust ports, first and second piston assemblies each of which assemblies includes at least one pair of diametrically opposed pistons within said working chamber rotatable about a rotational axis of said piston assemblies and dividing said working chamber into a plurality of pairs of diametrically opposed subchambers, means for interconnecting said first and second piston assemblies for variable-speed rotation of said first and second piston assemblies in the same direction during recurrent periods of rotation such that at least one pair of diametrically opposed subchambers decreases in volume while at least one other pair of diametrically opposed subchambers increases in volume, for each complete revolution of the first and second piston assemblies a plurality of operating cycles are completed, each operating cycle including successive power, exhaust, intake, and compression phases, and said interconnecting means includes first and second gear sets each of which gear set comprises noncircular Sakita type 1 and type 2 gears, wherein geometry of a noncircular segment of said Sakita type 1 gear is mathematically defined as $Qy=[Q1/(pi)][a\ \cos(beta)]+(alpha)[Q1/(pi)]\sin[a\ \cos(beta)]$ wherein beta=(D−2y)/[(alpha)y] and a cos=arc cosine, and geometry of a noncircular segment of said Sakita type 2 gear is mathematically defined as $x=D\{1+(alpha)\cos[Q(pi)/Q1]\}/\{2+(alpha)\cos[Q(pi)/Q1]\}$ wherein
alpha=(W0−Wmin)/W0,
D=Distance between the rotational centers of said Sakita type 1 and type 2 gears
y=Varying radius of said Sakita type 1 gear—distance between the rotation center and the point of contact with said Sakita type 2 gear,
W0=Rotational speed of said Sakita type 2 gear,
Wmin=Minimum rotational speed of said Sakita type 1 gear,
Q1=Total rotational angle of said Sakita type 1 gear in a noncircular segment and also the total rotational angle of said Sakita type 2 gear in a noncircular segment
Qy=Rotational angle of said Sakita type 1 gear measured from the end of the circular segment with smaller radius of said Sakita type 1 gear,
x=Varying radius of said Sakita type 2 gear—distance between the rotation center and the point of contact with said Sakita type 1 gear, and
Q=Rotational angle of said Sakita type 2 gear measured from the end of the circular segment with larger radius of said Sakita type 2 gear.

* * * * *